United States Patent [19]

Aoki

[11] Patent Number: 5,481,423
[45] Date of Patent: Jan. 2, 1996

[54] DISC CARTRIDGE LOADING APPARATUS

[75] Inventor: Yoshitaka Aoki, Tokyo, Japan

[73] Assignee: Sony Corporation, Tokyo, Japan

[21] Appl. No.: 16,606

[22] Filed: Feb. 11, 1993

[30] Foreign Application Priority Data

Feb. 17, 1992 [JP] Japan ................................ 4-061526

[51] Int. Cl.$^6$ .......................... G11B 17/04; G11B 33/02
[52] U.S. Cl. ...................................... 360/99.06; 369/75.2
[58] Field of Search ............................. 360/99.06, 99.02, 360/97.01; 369/75.1, 77.2, 72, 75.2

[56] References Cited

U.S. PATENT DOCUMENTS

| | | | |
|---|---|---|---|
| 4,641,211 | 2/1987 | Okita et al. ............................ | 360/99.06 |
| 4,707,819 | 11/1987 | Ehara .................................... | 360/99.06 |
| 4,901,174 | 2/1990 | Saito et al. ............................ | 360/99.06 |
| 4,918,553 | 4/1990 | Suzuki et al. ......................... | 360/99.06 |
| 5,195,079 | 3/1993 | Inoue et al. ............................ | 369/75.1 |

FOREIGN PATENT DOCUMENTS 217266 12/1984 Japan .................................. 360/99.06

Primary Examiner—Stuart S. Levy
Assistant Examiner—Allen Cao
Attorney, Agent, or Firm—Limbach & Limbach

[57] ABSTRACT

A disc cartridge loading apparatus includes a cartridge holder, a cartridge capturing member and a cartridge capturing operating lever. The cartridge holder holds an inserted disc cartridge. The cartridge capturing member is slidably mounted in the cartridge holder and has a cartridge capturing pin introduced into and engaged with a recess of the disc cartridge. The cartridge capturing member has a cam groove formed therein for causing the cartridge capturing pin to be intruded into and engaged in the recess of the disc cartridge without being contacted with the cartridge holder for capturing the cartridge capturing pin into the cartridge holder. The cartridge capturing operating lever slides the cartridge capturing member in a disc cartridge insertion direction under the bias of a tension coil spring and captures the disc cartridge into the cartridge holder.

2 Claims, 24 Drawing Sheets

DISC CARTRIDGE LOADING APPARATUS

BACKGROUND

1. Field of the Invention

The present invention relates to a loading apparatus. More particularly, the present invention relates to a disc cartridge loading apparatus for automatically capturing a disc cartridge into a cartridge holder.

2. Background of the Invention

A disc recording and reproducing apparatus including a loading apparatus for automatically capturing a disc cartridge has been proposed by the present applicant in Japanese Patent Application No. 02-281829 as published Japanese Laid-Open Patent No. 04-157660 (JP-A-04-157660). As shown in FIG. 2, the disc cartridge 401 rotatably accommodates an optical disc, a magneto-optical disc or the like and includes an upper half and a lower half. The loading apparatus for automatically capturing the disc cartridge includes, as shown in FIGS. 1 and 2, a cartridge capturing member 404, a cartridge capturing lever 405 and a cartridge capturing operating lever 406. The capturing member 404 has a cartridge capturing pin 403 introduced into and engaged with a recess portion 402 of the disc cartridge 401. The cartridge capturing pin 403 is provided on a distal end of the capturing member 404. The capturing lever 405 supports the capturing member 404 at a distal end portion. The capturing operating lever 406 reciprocatingly operates the capturing lever 405 in the insertion direction of the disc cartridge. The cartridge capturing member 404 is rotatably mounted on the distal end of the capturing lever 405 by a supporting shaft 407. The capturing member 404 is adapted for perpetually biasing the capturing pin 403 in a direction towards the outer lateral side of a cartridge holder 409 as indicated by an arrow a in FIG. 2 by a torsion spring 408. In the ejecting state shown in FIG. 2, the cartridge capturing pin 403 is kept in contact with a pin position controlling tongue 411 under the bias of the torsion spring 408. The pin position controlling tongue 411 is formed by a rim of the opening of a cartridge holding section 401 of the cartridge holder 409. The cartridge capturing lever 405 is engaged with a pair of guide pins 412, 413 formed on an upper plate of the cartridge holder 409 and is reciprocated in the direction of insertion into the cartridge holder 409 for a disc cartridge 401. The cartridge capturing operating lever 406 is formed as a substantially crescent-shaped planner member having its central portion supported for rotation on the upper plate of the cartridge holder 409 about the supporting shaft 414 as the center of rotation. An engaging pin 415 mounted on one end of the capturing operating lever 406 is engaged with an engaging opening 416 of the cartridge capturing lever 405. As a result, when the cartridge capturing operating lever 406 is rotated about the supporting shaft 414 as the center of rotation, the engaging pin 415 is engaged with the cartridge capturing lever 405 and the cartridge capturing lever 405 is reciprocated in the insertion direction of the disc cartridge 401.

The advancing and receding of the cartridge capturing lever 405 is carried out by a tension spring 417 installed between the cartridge holder 409 and the capturing operating lever 406. Before the disc cartridge 401 is inserted into the cartridge holder 409, the tension spring 417 is tensioned by an ejecting plate 418, such that the cartridge capturing lever 405 is positioned at an inserting and ejecting opening of the cartridge holder 409 and the cartridge capturing pin 403 of the cartridge capturing member 404 is rotatably supported at the distal end of the lever 405 and kept in contact with the pin position controlling tongue 411. When ejecting plate 418 is unlocked by the disc cartridge inserted into the cartridge holder 409, a holding lever 419 holding the ejecting plate 418 is disengaged from a pin 420 rotationally operating the holding lever 419, and the capturing operating lever 406 is rotated under the force of the tension coil spring 417. As a result, the capturing member 404 is automatically captured in the disc cartridge insertion direction. At this time, cartridge capturing pin 403 is introduced into and engaged with the recess portion 402 of the disc cartridge 401, so that the disc cartridge is automatically captured into the cartridge holder 409.

In the above-described loading apparatus, when the device of the loading apparatus is moved from the ejecting state to the loading state, the cartridge capturing pin 403 capturing the disc cartridge 401 proceeds to capture the disc cartridge 401 into the inside of the cartridge holder 409 under the force of the torsion spring 408, with the capturing pin 403 being kept in contact with the tongue 411 during capturing of the disc cartridge 401. As a result, a capturing force larger than is necessary is exerted during capturing of the disc cartridge 401 due to friction between the cartridge capturing pin 403 and the tongue 411, such that the tension coil spring 417 mounted between the lever 406 and the cartridge holder 409 needs to be increased in its spring force or spring constant. The result is that it becomes difficult to maintain the ejecting plate 418 at the ejecting position against the force of the tension coil spring 417.

For overcoming these problems, it may be contemplated to provide for a lower spring constant of the tension coil spring 408 adapted for biasing the cartridge capturing pin 403 towards the tongue 411 for diminishing the force of friction between the cartridge capturing pin 403 and the tongue 411. However, in such case, it becomes frequently difficult to open a shutter member 422 adapted for closing an opening 421 of the disc cartridge 401 because the shutter member 422 is subject to load fluctuations by reason of a more or less delicate force balance necessary for a normal operation of the shutter member 422.

The tension coil spring 417 for automatically capturing the disc cartridge 401 into the cartridge holder 409 is arranged substantially in parallel with the insertion direction of the disc cartridge 401. In addition, in the above-described disc loading apparatus, a shutter opening mechanism having a shutter opening lever 430 for automatically opening a shutter provided on the disc cartridge 401 and a trigger mechanism for automatically loading the disc cartridge held by the cartridge holder 409 are arranged in the parallel with the tension coil spring 417.

Since the three different mechanisms are arranged in parallel in the traverse direction of the apparatus, limitations are placed on the size of an opening 431 formed on the cartridge holder 409. That is, if limitations are placed on the size of the opening 431, sufficient space for a unit for vertical movement of the magnetic head 432, as viewed from the opening, cannot be assured.

On the other hand, since the tension coil spring 417 is retained by the cartridge capturing operating lever 406 at a position spaced apart from the center of rotation of the cartridge capturing operating lever 406, a retainer 434 for the tension coil spring 417 on the lever 406 is spaced a larger distance from the center of rotation of the lever 406. The result is a larger displacement of the tension coil spring 417 so that the capturing force of the disc cartridge is not constant.

SUMMARY OF THE INVENTION

It is, therefore an object of the present invention to provide a disc cartridge loading apparatus which resolves the above mentioned problems.

It is another object of the invention to provide a disc cartridge loading apparatus wherein a disc cartridge may be captured with a smaller force into a cartridge holder without a cartridge capturing pin being contacted with to the cartridge holder.

It is a further object of the present invention to provide a disc cartridge loading apparatus whereby a space of the cartridge holder may be utilized effectively and the disc cartridge may be captured by a constant force.

According to a first embodiment of the present invention, there is provided a disc cartridge loading apparatus including a cartridge holder, a cartridge capturing member and a cartridge capturing operating lever. The cartridge holder receives an inserted disc cartridge. The cartridge capturing member is slidable mounted on the cartridge holder and has a cartridge capturing pin and at least one cam groove. The cartridge capturing pin is introduced into and engaged with a recess portion of the disc cartridge. The cam groove is formed for causing the cartridge capturing pin to be introduced into and engaged with the recess portion of the disc cartridge without being contacted with the cartridge holder for capturing the cartridge capturing pin into the cartridge holder. The cartridge capturing operating lever slides the cartridge capturing member in a disc cartridge insertion direction under the bias force of a tension coil spring and captures the disc cartridge into the cartridge holder.

According to a second embodiment of the present invention, there is provided a disc cartridge loading apparatus including a cartridge holder, a cartridge capturing member, a cartridge capturing operating lever and a tension coil spring. The cartridge holder holds an inserted disc cartridge. The cartridge capturing member is slidably mounted on the cartridge holder and has a cartridge capturing pin. The cartridge capturing pin is introduced into and engaged with a recess portion of the disc cartridge. The cartridge capturing operating lever slides the cartridge capturing member in a disc cartridge insertion direction. The tension coil spring is provided between the cartridge capturing operation lever and the cartridge holder in a direction substantially at right angles to the direction of insertion of the disc cartridge into the cartridge holder.

In the first above-described embodiment of the invention, the cartridge capturing member provided with the cartridge capturing pin for capturing the disc cartridge into the cartridge holder has the cam groove for causing the cartridge capturing pin to be inserted and engaged in the recess portion capturing the capturing pin into the cartridge holder without the cartridge capturing pin being contacted with the cartridge holder so that the cartridge capturing pin is not contacted with the cartridge holder during capturing of the disc cartridge.

In the second above-described embodiment of the invention, the tension coil spring for automatically capturing the disc cartridge is mounted under tension in a direction substantially at right angles to the direction of insertion of the disc cartridge into the cartridge holder and an opening formed on the cartridge holder for facing a magnetic head may be increased in size to provide a sufficient space for the magnetic head.

BRIEF DESCRIPTION OF THE DRAWING

The invention will be more readily understood with reference to the accompanying drawing, wherein.

DESCRIPTION OF THE INVENTION

Referring the drawings, the preferred embodiments of the present invention will be explained in detail. In the present embodiment, the present invention is applied to a disc recording and/or reproducing apparatus for recording and/or reproducing information signals on or from an optical disc or a magneto-optical disc.

A disc cartridge housing the optical disc or the magneto-optical disc therein and adapted for being loaded in the optical disc recording and/or reproducing apparatus is first explained.

Figure 1:
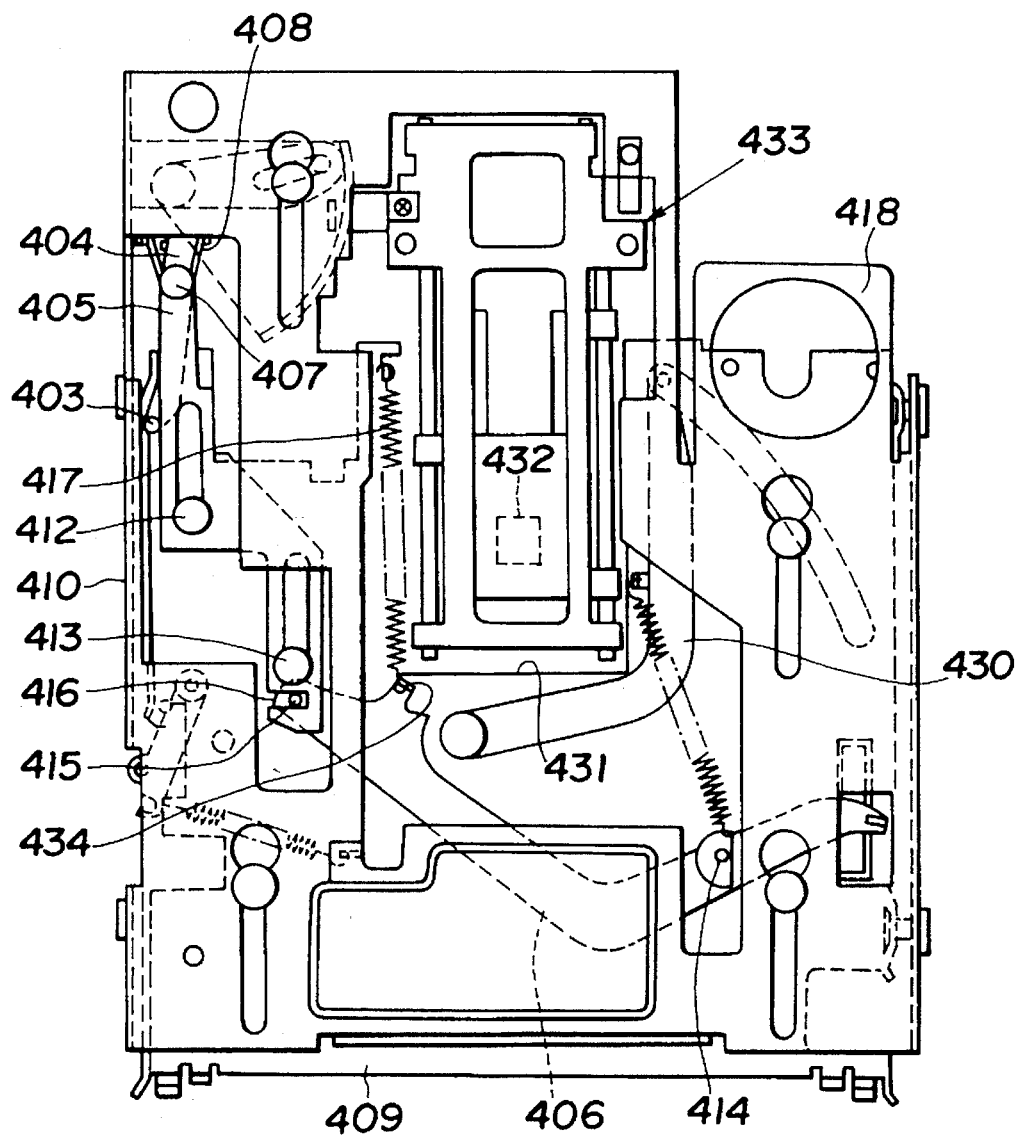
FIG. 1 shows a plan view of a background-art disc cartridge loading apparatus, as viewed from the upper side.
Figure 2:
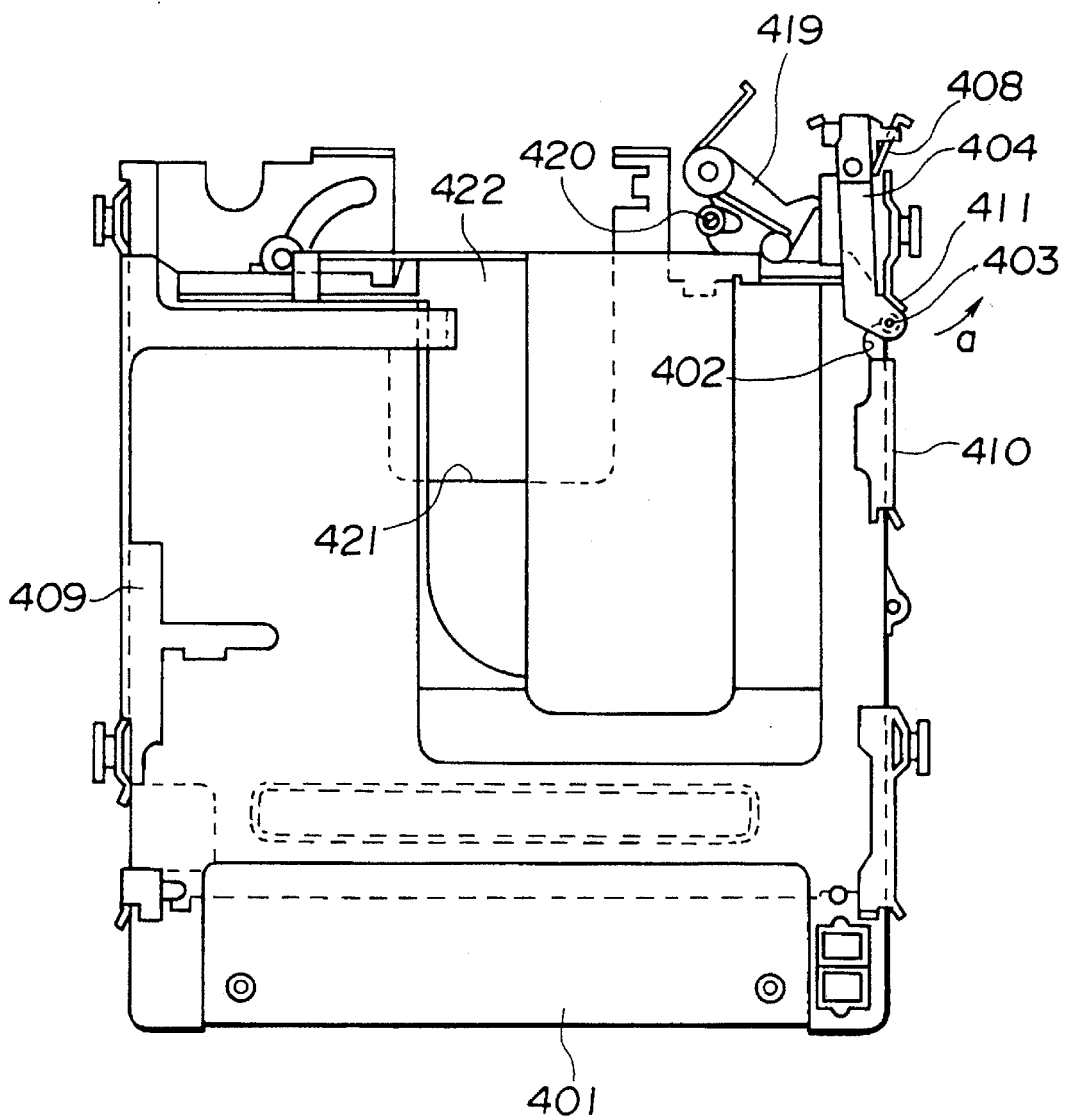
FIG. 2 shows a plan view of the disc cartridge loading apparatus shown in FIG. 1, as viewed from the bottom side.
Figure 3:
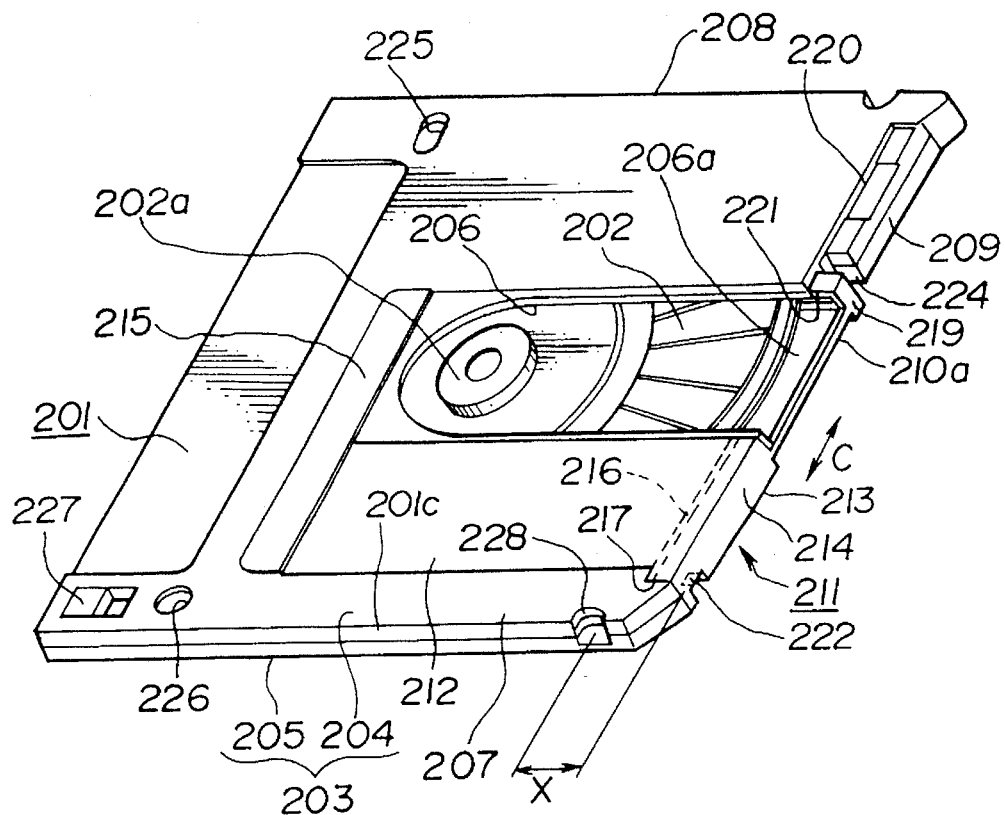
FIG. 3 shows a perspective view of a conventional optical disc cartridge.

As shown in FIG. 3, a disc cartridge 201 includes a cartridge main body 203 for rotatable housing an optical disc 202 as shown in FIG. 3. The optical disc 202 is a magneto-optical disc and has a transparent substrate and recording layer formed on the one surface of the transparent substrate. Information signals are recorded on or reproduced from the optical disc 202 by optical or magneto-optical method. The optical disc 202 has one of its major surfaces as a signal recording surface. The chucking hub 202a is provided at a central portion of one of the major surface of the substrate of the optical disc 202. The chucking hub 202a is adapted to be chucked by the recording and/or reproducing apparatus of the embodiment. Meanwhile, the optical disc 202 is a magneto-optical disc which has a vertical magnetic film as a recording layer and diameter of 3.5 inches. The optical disc 202 is housed rotatably within the cartridge main body 203.

The cartridge main body 203 is made up of an upper rectangular half 204 and a lower rectangular half 205 each being of a size to accommodate the optical disc 202 therein and adapted to be abutted and connected to each other. The lower half 204 of the cartridge main body 203 has a first aperture 206 for exposing the chucking hub 202a of the optical disc 202 to the outside and also for exposing a part of the signal recording surface of the optical disc 202 housed within the cartridge main body 203 to the outside across the inner and outer peripheries of the optical disc 202. A first aperture 206 is formed at a central portion of the transverse length between lateral sides 207 and 208 of the cartridge main body 203 in the form of an elongated hole extending from a front side 209 as far as a central region of the lower half 204. When the disc cartridge 201 is loaded in the disc recording and/or reproducing apparatus, the chucking hub 202a is caused to face the disc table of a rotating and driving device for rotationally driving the optical disc 202, while the signal recording surface of the optical disc 202 is similarly exposed to an optical pickup device adapted for radiating a laser beam to the signal recording surface, through the first aperture 206.

The upper half 205 has a second aperture, not shown, at a position of facing the first aperture 206 provided in the lower half 204. The second aperture is formed at a position offset towards the front side 209 of the cartridge main body 203 and is in the form of a rectangle large enough to expose a part of the other major surface of the optical disc 202 to the outside across the radially inner and outer regions of the disc. The second aperture has the function of exposing the other major surface of the optical disc 202 to a magnetic head device when the disc cartridge 201 is loaded on the disc recording and/or reproducing apparatus.

Meanwhile, the portions of the front side 209 of the cartridge main body 203 in register with the first aperture 206 and the second aperture are formed with recesses 206a, 210a to permit the magnetic head device and the optical pickup device to be intruded easily into facing and proximate relation with respect to the major surfaces of the optical disc 202. That is, the central portion in the vicinity of the front surface 209 of the cartridge main body 203 is reduced in thickness in the portions in register with the first aperture 206 and the second aperture of the cartridge main body 203.

A shutter member 211 for opening and closing the first aperture 206 and the second aperture is slidable mounted on the cartridge main body 203. The shutter member 211 has a first shutter plate portion 212 for closing the first aperture 206 of the lower half 204, a second shutter plate portion 213 extending parallel to the first shutter plate portion 212 for closing the second aperture of the upper half 205 and a connecting portion interconnecting the first and second shutter plate portions 212, 213. The first shutter plate portion 212 is in the form of a rectangle of a narrow width and a size large enough to close the first aperture 206 of the lower half 204. The distal part of the shutter plate portion 212 is pressed and retained by a shutter retainer 215 mounted on the outer lateral surface of the lower half 204 to prevent the first shutter plate portion 212 from being floated away from the cartridge main body 203. A first engaging pawl 217 is formed in the proximal end of the first shutter plate portion 212 connected to the connecting portion 214 by segmenting and bending a part of the first shutter plate portion 212 towards the second shutter plate portion 213. The first engaging pawl 217 is engaged with a first slide guide groove 216 formed on the outer lateral surface of the lower half 204. On the other hand, the second shutter plate portion 213 is formed as a rectangle of a broad width to close at least the second aperture of the cartridge main body 203.

The connecting portion 214 interconnecting the shutter plate portion 212, 213 has a width approximately equal to the thickness of the cartridge main body 203. The connecting portion 214 is adapted for being slidingly contacted with the front surface 209 of the cartridge main body 203 for stable sliding movement of the shutter member 211. The connecting portion 214 has clearances for exposing the recesses 206a, 210a formed in the upper half 205 and in the lower half 204 in register with the first aperture 206 and the second aperture opened by sliding movement of the shutter member 211. Consequently, the narrow width portion of the connecting portion 214 provided with these clearances assures facilitated intrusion of the magnetic head device and the optical pickup device into a state proximate and facing to the optical disc 202.

A slide guide pawl 219 is formed on a lateral side of the connecting portion 214 connected to the first shutter plate portion 212 for being extended in the same direction as the first shutter plate portion 212. The distal end of the slide guide pawl 219 is bent towards the second shutter plate portion 213 into engagement with a second guide groove 220 formed in the lower half 204 parallel to the first slide guide groove 216. That is, by engaging the engaging pawls 217, 219 in the first and second slide guide grooves 216, 220, respectively, the shutter member 211 is controlled in its sliding movement along the front side 209 of the cartridge main body 203, while being prevented from being extricated from the cartridge main body 203.

A torsion spring, not shown, is provided in the cartridge main body 203. The torsion spring is to bias the shutter member 211 at all times in the direction of closing the first aperture 206 and the second aperture. The connecting portion 214 is provided with a spring retainer 222 for retaining one end of the torsion coil spring. The spring retainer 222 is bent towards the inside of the cartridge main body 203 substantially in parallel with the first and second shutter plate portions 212, 213, so that one end of the torsion coil spring is retained by its distal end. Meanwhile, the other end of the torsion coil spring is retained by the corner of an inner forward portion of the main cartridge body 203.

The above-described shutter member 211 may be moved between a position of closing the first aperture 206 and the second aperture and a position of opening these apertures as shown by arrow C in FIG. 3. The front surface 209 of the cartridge main body 203 is formed with a receiving portion 224 to move the shutter member 211 in the direction of the opening the first aperture 206 and the second aperture when the disc cartridge 201 is loaded in the disc recording and/or reproducing apparatus. At this time, the shutter opening pin as the shutter opening member is intruded and horded by the receiving portion 224 when the shutter member 211 is moved by the shutter opening pin. The receiving portion 224 is formed as a groove or recess at a position faced by the lateral side of the connection portion 214 of the shutter member 211 when the first aperture 206 and the second aperture have been opened.

The lower half 204 is provided with a pair of pin engaging holes 225, 226 engaged by positioning pins adapted for setting the horizontal loading position of the disc cartridge 201 when the disc cartridge 201 is loaded on the disc recording and/or reproducing apparatus. A mistaken erasure inhibiting member 227 for selecting if information signals may be written on the optical disc 202 is mounted in the vicinity of the positioning pin engaging hole 226. A capturing pin engaging hole 228, engaged by a disc cartridge capturing pin provided in the loading mechanism of the disc recording and/or reproducing apparatus, is formed towards the front side of the lateral surface 207 of the cartridge main body 203.

The magnetic disc cartridge accommodating a magnetic disk which, by its nature, should not be loaded on the present disc recording and/or reproducing apparatus, is hereinafter explained.

Figure 4:
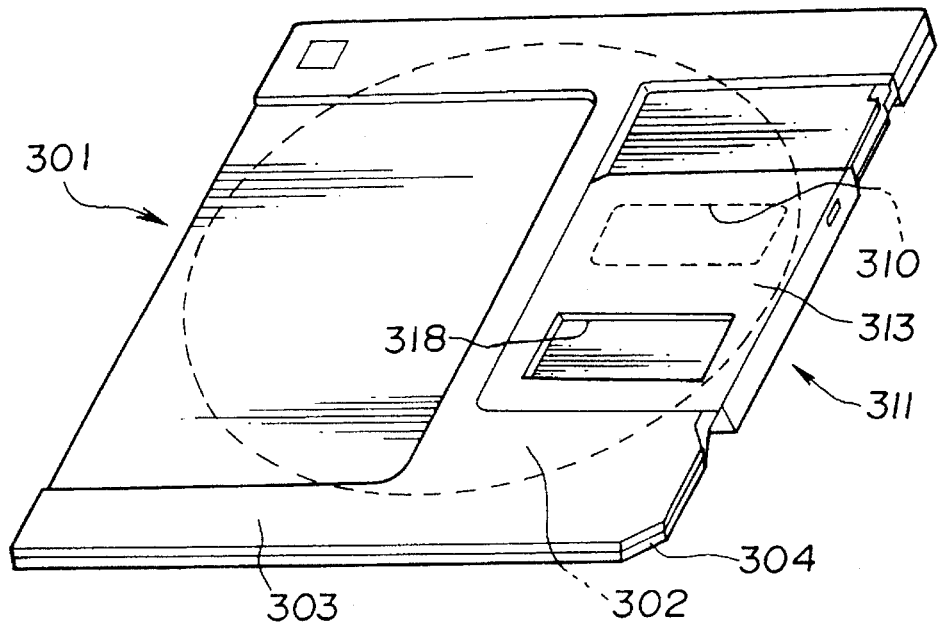
FIG. 4 shows a perspective view of a magnetic disk cartridge.

Such magnetic disk cartridge 301 includes a cartridge main body 302 housing a magnetic disk such as a floppy disk, as shown in FIG. 4. The magnetic disk has a disk base plate formed of a thin flexible synthetic resin sheet, 3.5 inches in diameter and magnetic recording layer formed on the disk base plate. The cartridge main body 302 is formed a recording/reproducing opening 310. The cartridge main body 302 is substantially of the same size and shapes as that of the cartridge main body 203 housing the optical disc 202 of the disc cartridge 201. A shutter member 311 is slidable mounted on the cartridge main body 303. The shutter member 311 has a pair of shutter plate portions 313 which are each formed apertures 318. The shutter member 311 may be slid so the recording/reproducing opening 310 is in register with the aperture 318 for opening the opening 310 or the aperture 318 is out of register with the recording/reproducing opening 310 for closing the recording/reproducing opening 310.

The arrangement of the disc recording and/or reproducing apparatus in which the disc cartridge 201 housing the optical disc 202 as a recording medium is employed is hereinafter explained.

Figure 5:
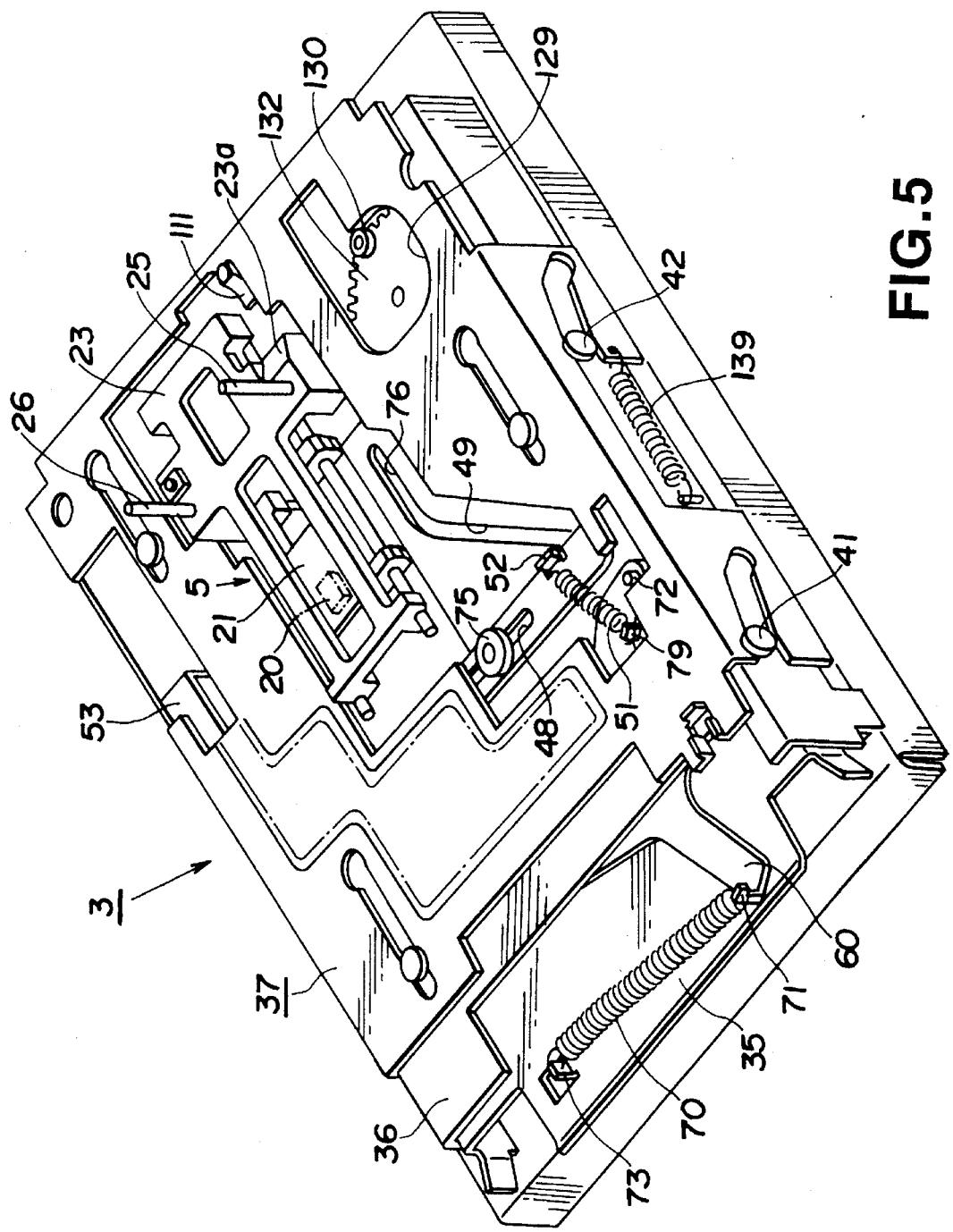
FIG. 5 shows a perspective view of a disc loading apparatus of the present of the invention.

The disc recording and/or reproducing apparatus, as shown in FIG. 5, includes mechanism, devices and means for loading the disc cartridge 201 therein and recording and/or reproducing information signals on or from the optical disc 202. That is, the disc recording and/or reproducing apparatus has a disc loading mechanism 3 for loading the disc cartridge 201 on a cartridge loading section 1 (shown in FIG. 7) and loading the optical disc 202 on the disc table of the disc rotating and driving device 2, an optical pickup device 4 for being moved across the inner and outer peripheries of the optical disc 202 loaded and rotated on the disc table for recording and/or reproducing information signals on or from the optical disc 202 and a magnetic head device 5 for applying an external magnetic field when recording information signals on the optical disc 202.

Figure 6:
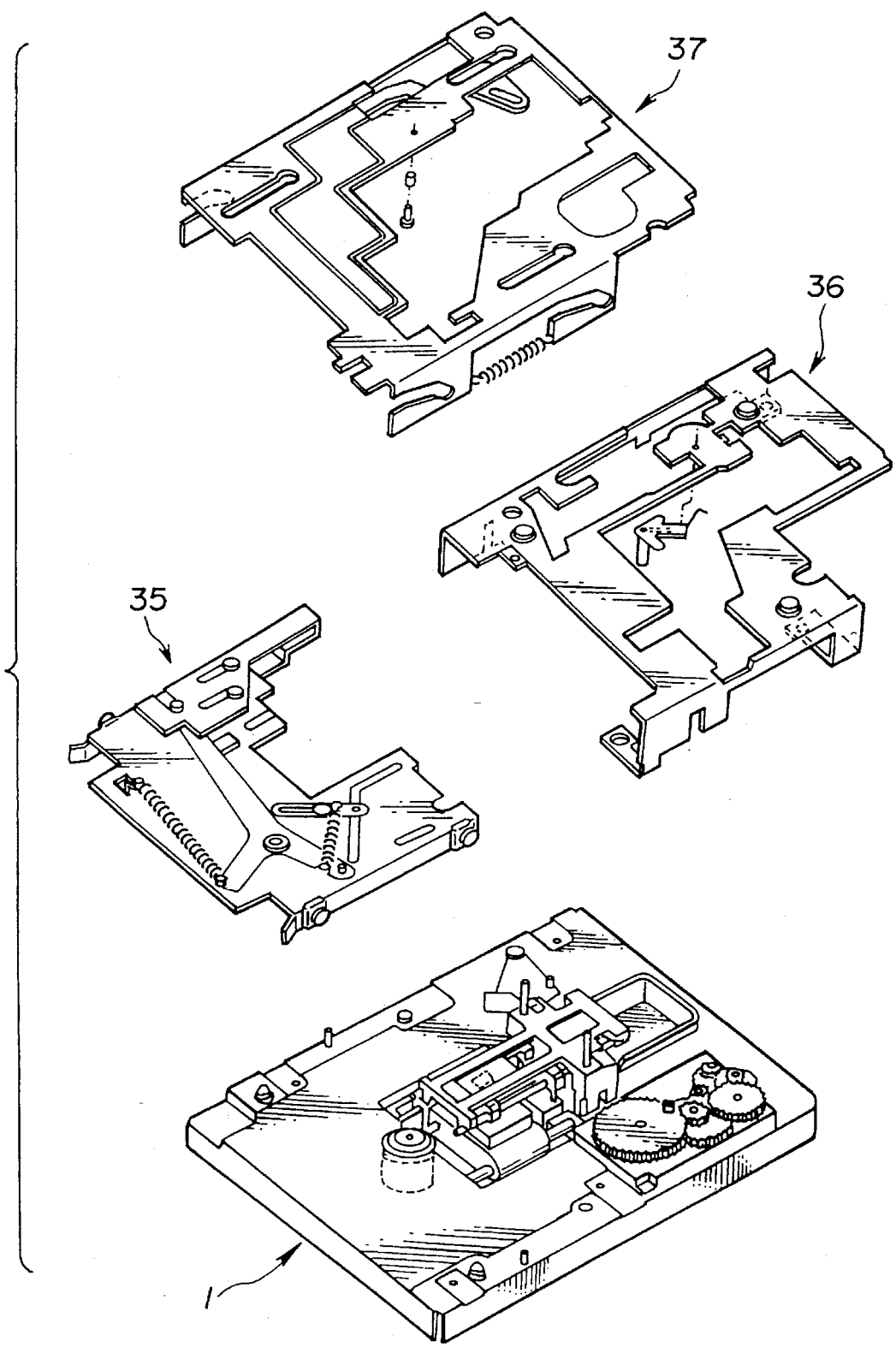
FIG. 6 shows an exploded perspective view of the disc cartridge loading apparatus shown in FIG. 5.
Figure 7:
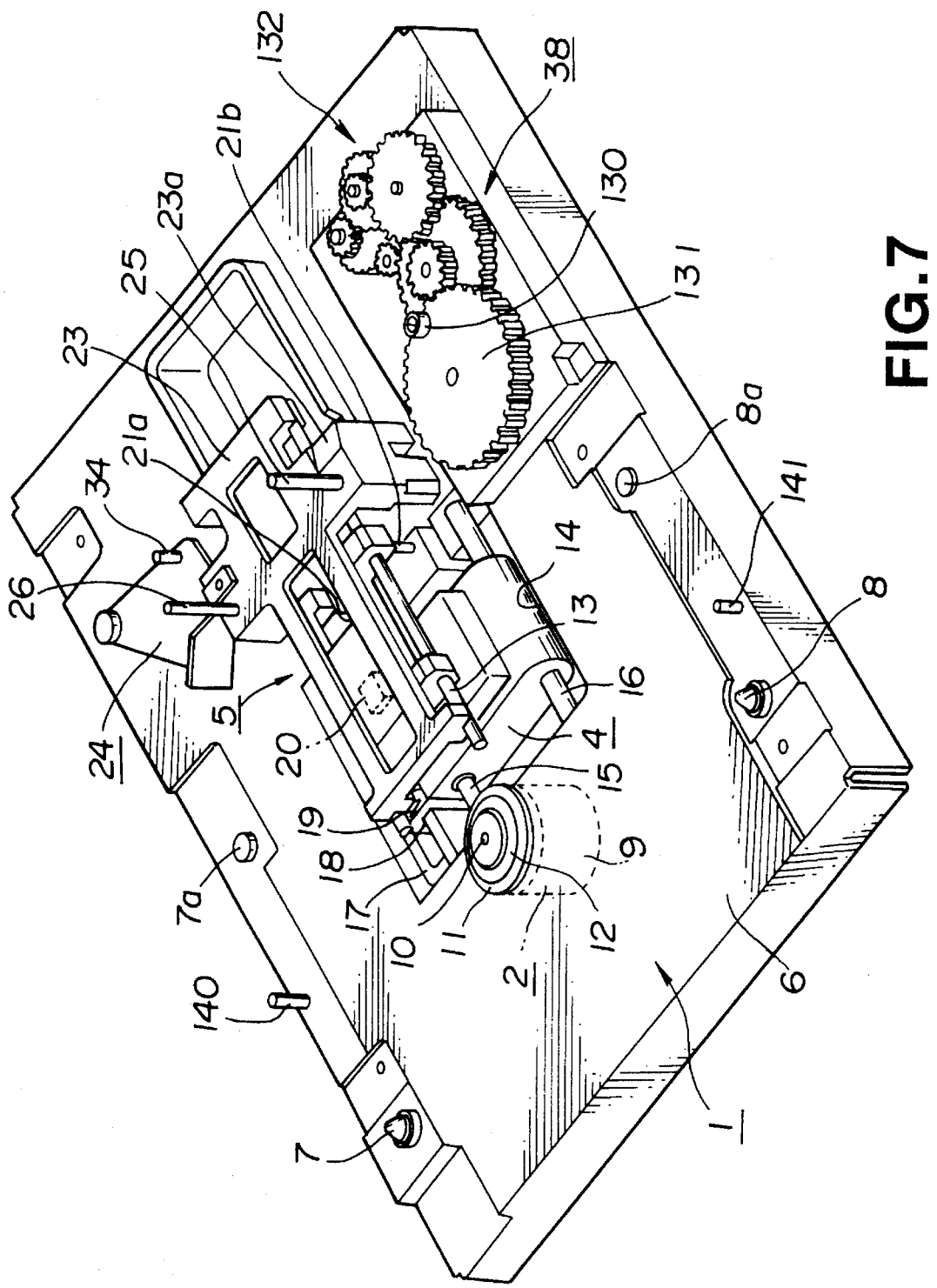
FIG. 7 shows a perspective view of an arrangement of a cartridge loading section of the loading apparatus shown in FIG. 5.

The cartridge loading section 1 has a base plate 6 as a chassis on which are mounted devices such as the disc rotating and driving device 2 and the optical pickup device 4, as shown in FIGS. 5 to 7. That is, the cartridge loading section 1 is arranged for loading the disc cartridge 201 on the upper surface of the base plate 6. Disc cartridge positioning pins 7, 8 are formed on the cartridge loading section 1 for being engaged in engaging holes 225, 226 formed in the disc cartridge 201. When the disc cartridge 201 is loaded on the cartridge loading section 1, the disc cartridge positioning pins 7, 8 are engaged in the engaging holes 225, 226. The cartridge loading section 1 is provided with height reference pins 7a, 8a for maintaining a predetermined height position of the disc cartridge 201 with respect to the base plate 6. As a result, the disc cartridge 201 is loaded in a predetermined position of the cartridge loading section.

The disc rotating and driving device 2 for rotationally driving the optical disc 202 of the disc cartridge 201 loaded on the cartridge loading section 1 is mounted at a central position of the base plate 6 of the cartridge loading section 1. The disc rotating and driving device 2 is mounted on the bottom surface of the chassis 6 and includes a driving motor 9 having a rotating shaft as a spindle shaft 10 protruded above the upper surface of the chassis 6. A disc table 11 for setting the optical disc 202 is integrally mounted on the distal end of the spindle shaft 10. A disc attracting magnet 12 is mounted on the disc table 11 for holding the chucking hub 202a of the optical disc 202 under magnetic attraction.

The optical pickup device 4 is mounted on the base plate 6. The optical pickup device 4 has an objective lens 13 for focusing a laser beam on the recording layer of the optical disc 202 set on the disc table 11. The optical pickup device 4 is supported by a pair of guide shafts 15, 16 mounted for bridging an opening 14 provided at a central portion of the base plate 6 for loading the optical pickup device 4. The optical pickup device 4, supported in this manner, is adapted for being transported in the radial direction of the disc 202 along feed guide shafts 15, 16 by a so-called linear motor including a pair of driving magnets 17, 18 mounted within the loading opening 14 and a driving coil 19.

Figure 11:
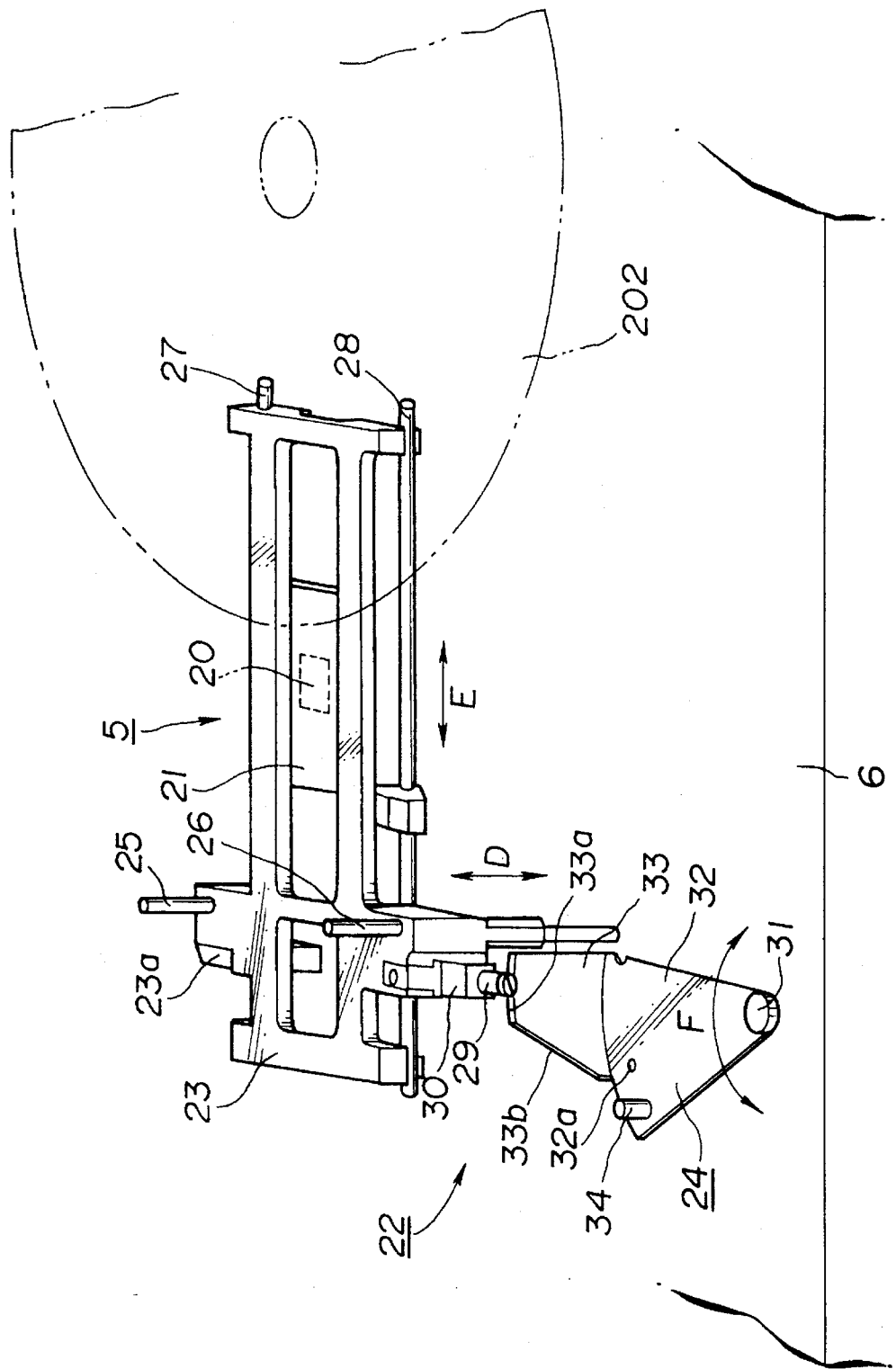
FIG. 11 shows a perspective view of the state during the ejection of a magnetic head lifting device of the loading apparatus shown in FIG. 5.

The magnetic head device 5 is connected to the optical pickup device 4. As a result, the magnetic head device 5 is transported across the inner and outer peripheral of the optical disc 202 in synchronism with the optical pickup device 4. The magnetic head device 5 has a magnetic head 20 including a coil adapted for producing a vertical magnetic field of a predetermined strength according to recording data to the recording layer of the optical disc 220, as shown in FIG. 11. The magnetic head 20 is supported by being mounted on a frame member 21 movably mounted with respect to a lifting frame member of a magnetic head lifting device to be later described.

A distance sensor, not shown, for maintaining a constant distance at all times between the magnetic head 20 and the optical disc 202 is provided on the frame member 21. The frame member 21 is provided with a pair of depending connecting members 21a, 21b depending towards the optical pickup device 4, as shown in FIG. 7, and the optical pickup device 4 is connected to the lower ends of the connecting members 21a, 21b. Consequently, the frame member 21 is transported radially across the inner and outer peripheries of the optical disc 202 in synchronism with the optical pickup device 4 so that the magnetic head 20 faces the objective lens 13 of the optical pickup device 4 at all times via the optical disc 202.

The above-described magnetic head device 5 is moved into a perpendicularly direction of the major surface of the optical disc 202 by the by the magnetic head lifting device 22. The magnetic head lifting device 22 includes a lifting frame member 23 supporting the frame member 21 provided with the magnetic head 20 and a frame lifting lever 24 for moving the lifting frame member 23 into the perpendicularly direction of the major surface of the optical disc 202.

The lifting frame member 23 is supported for movement into and out of contact with the base plate 6 in a vertical direction as shown by arrow D in FIG. 11, by a pair of lifting shafts 25, 26 formed on the base plate 6 so as to clear the disc cartridge 201. A pair of supporting shafts 27, 28 are mounted on the side of the lifting frame member 23 facing the optical pickup device 4, with the axes of the shafts 27, 28 extending parallel to the major surface of the optical disc 202 and being directed along the radius of the optical disc 202. The frame member 21 is mounted on these supporting shafts 27, 28 for movement axially of the optical disc 202, that is along the radius of the optical disc 202, as shown by arrow E in FIG. 11. A lifting engaging pin 29 is provided in the vicinity of the lifting shaft 26 of the lifting frame member 23. The lifting engaging pin 29 is slidingly contacted with the lifting lever 24 adapted for vertically moving the magnetic head movement frame member 23. The lifting engaging pin 29 is mounted at a distal end of a mounting member 30 mounted depending from a lateral side of the lifting frame member 23.

The frame lifting lever 24 is slidingly contacted with the lifting engaging pin 29 for vertically moving the lifting frame member 23. The frame lifting lever 24 is supported on the chassis base plate 6 by a supporting shaft 31 for rotation about the shaft 31 as a center of rotation, as shown by arrow F in FIG. 11, at a position in register with the lifting engaging pin 29. The frame lifting lever 24 is included of a sector-shaped sliding contact portion 32, moved in sliding contact with the base plate 6 and a vertical movement guide 33 upstanding from the sliding contact portion 32. The sliding contact portion 32 has a minor projection 32a for allowing point contact of the sliding contact portion 32 with the base plate 6 for facilitating the sliding of the sliding contact portion 32 with respect to the base plate 6. A lever operating pin 34 is provided on an ejection plate of the disc loading mechanism 3 to be later described. The lever operating pin 34 is intruded into an operating member for operating the lifting frame member 23.

Figure 12:
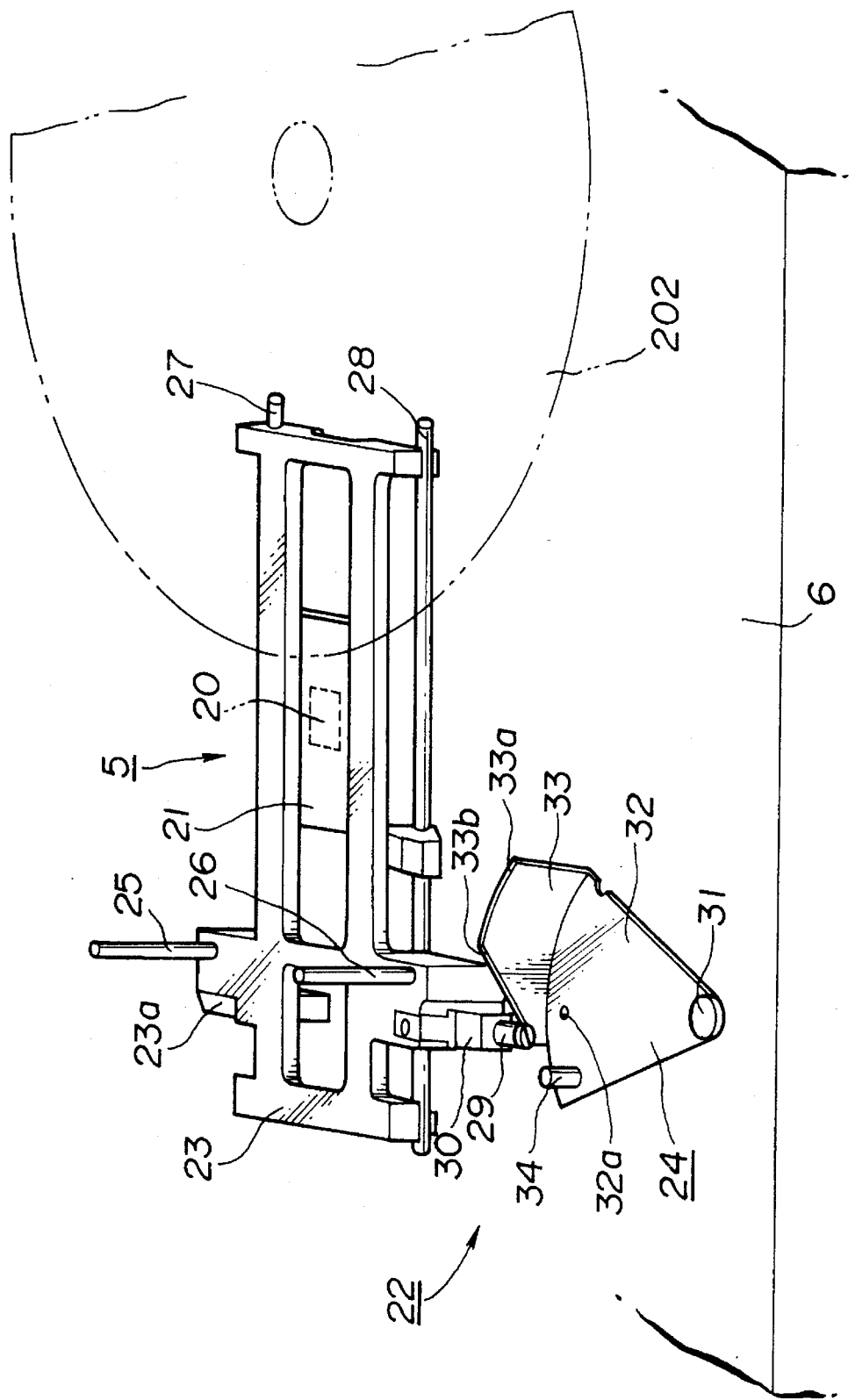
FIG. 12 shows a perspective view of the loading state the magnetic head lifting device of the loading apparatus shown in FIG. 5.

The vertical guide portion 33 has an upper end of its upstanding wall slidingly contacted with the lifting engaging pin 29 and is included of a parallel portion 33a parallel to the base plate 6 and an inclined portion 33b inclined from the parallel portion 33a towards the sliding contact portion 32. That is, the state in which the lifting engaging pin 29 is engaged with the parallel portion 33a, that is in the ejecting position, the lifting frame member 23 is spaced apart from the optical disc 202, and is maintained at a position in which the magnetic head 20 is kept out of abutment against the disc cartridge 201 when at least the disc cartridge 201 is inserted, as shown in FIG. 11. Conversely, when the lifting engaging pin 29 is engaged with the lower end of the inclined portion 33b, that is in the loading state, the lifting frame member 23 is proximate to the optical disc 202 and is maintained at a position in which the magnetic head 20 is able to apply a vertical magnetic field as an external magnetic field to the recording layer of the optical disc 202, as shown in FIG. 12.

Consequently, the frame member 21, transportable mounted on the lifting frame member 23, may be transported radially across the inner and outer peripheries of the optical disc 202, while the lifting engaging pin 29, provided on the lifting frame member 23, is slidingly engaged with the parallel portion 33a and the inclined portion 33b by rotation of the frame lifting lever 24. As a result, the frame member 21 may be moved in the perpendicular direction of the optical disc 202 between a position of closing the major surface of the optical disc 202 and a position of going away the major surface of the optical disc 202.

An engaging surface 23a engaged with a magnetic head holding unit for holding the lifting frame member 23 at a height position which is reached when the lifting frame member 23 has moved the frame member 21 to a position proximate to the optical disc 202 is provided on the lifting frame member 23 in the vicinity of the lifting shaft 25. The engaging surface 23a is formed on the frame member 23 on the opposite side of the frame member 21 as an inclined surface which is inclined towards the base plate 6.

The disc loading mechanism 3 loads the disc cartridge 201 on the loaded section. The loading mechanism 3 is included a cartridge holder 35 in which the disc cartridge 201 to be loaded on the disc recording and/or reproducing apparatus is introduced and held, a holder supporting plate 36 supporting the cartridge holder 35, an ejecting plate 37 for vertically moving the cartridge holder 35 with respect to the cartridge loading section 1 and displacing the disc cartridge 201 to a position of ejection, and an ejecting plate sliding unit 38 for sliding the ejecting plate 37, as shown in FIGS. 5 to 10.

Figure 9:
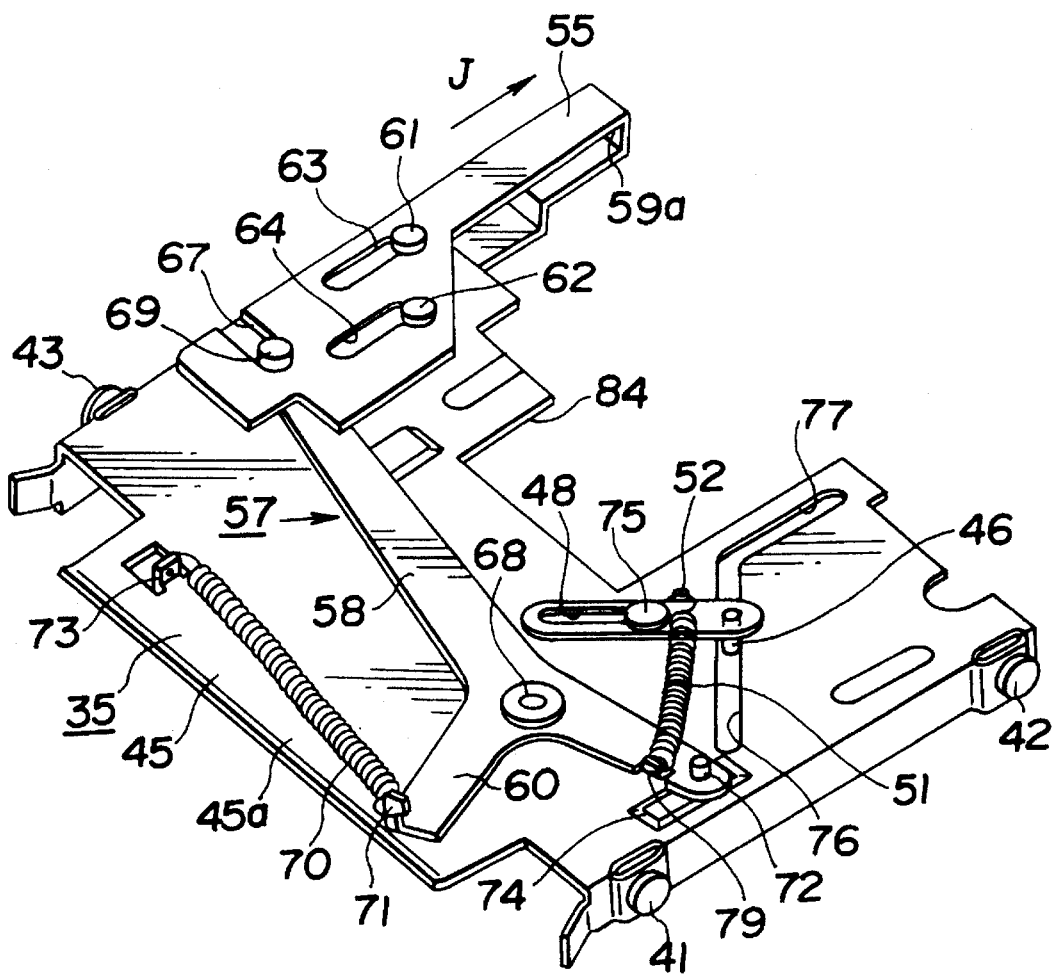
FIG. 9 shows a perspective view of an arrangement of a cartridge holder of the loading apparatus shown in FIG. 5.
Figure 13:
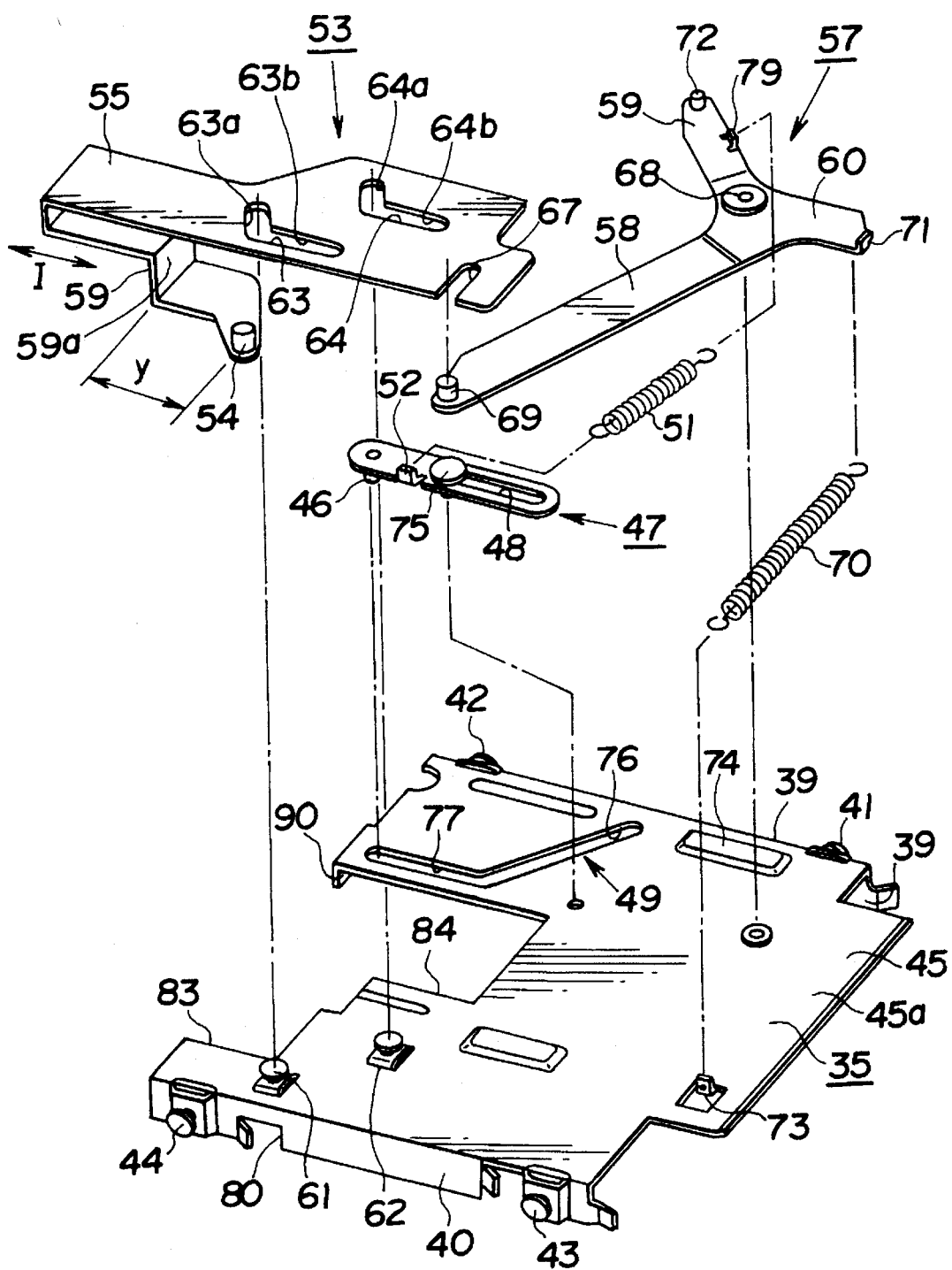
FIG. 13 shows an perspective view of the cartridge holder.
Figure 14:
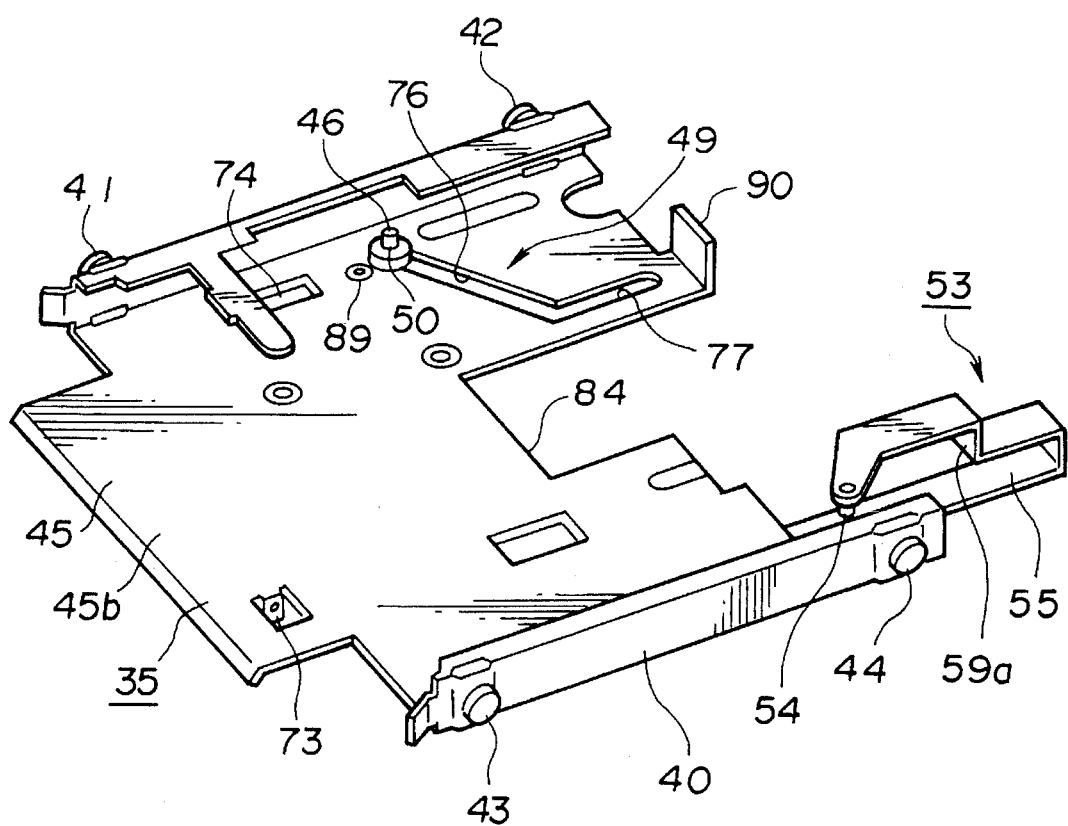
FIG. 14 shows a perspective bottom side view of the cartridge holder.
Figure 15:
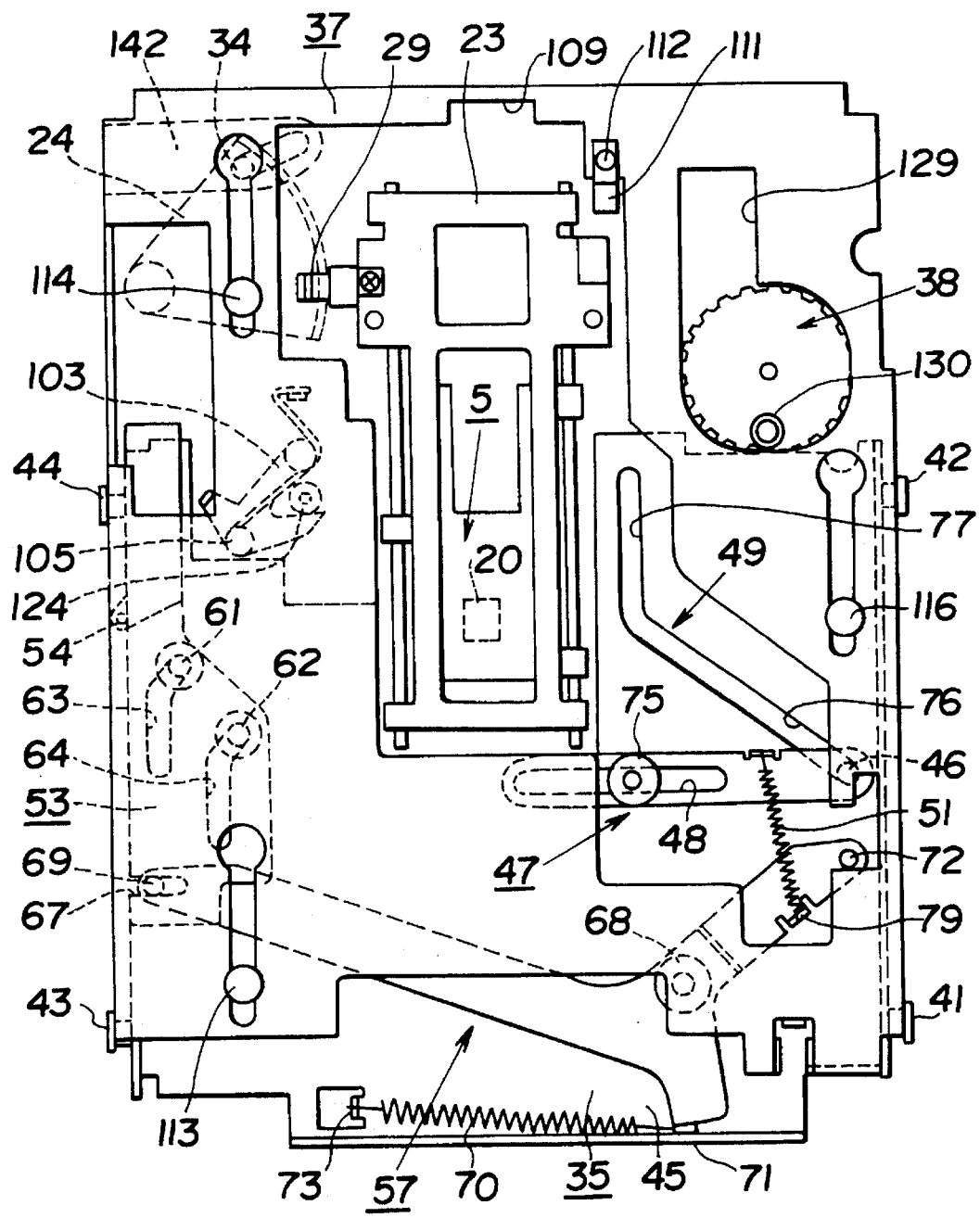
FIG. 15 shows a plan view of the ejecting state of the loading apparatus shown in FIG. 5.
Figure 16:
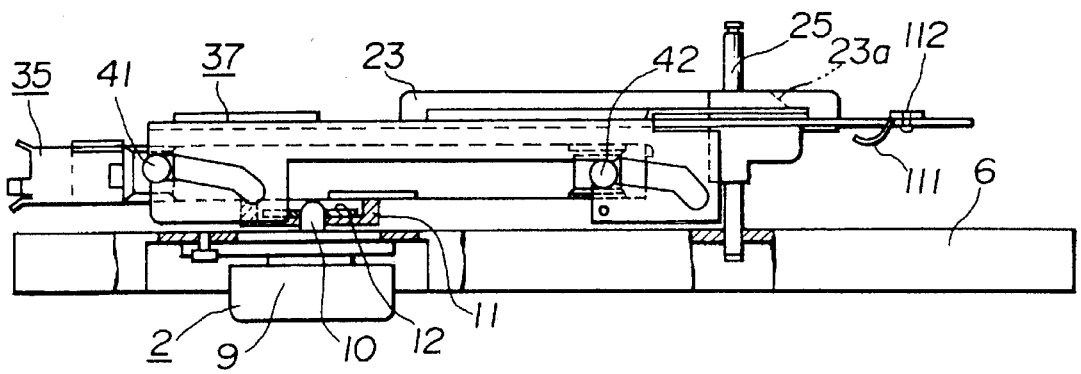
FIG. 16 shows a right side view of the ejecting state of the loading apparatus shown in FIG. 5.
Figure 17:
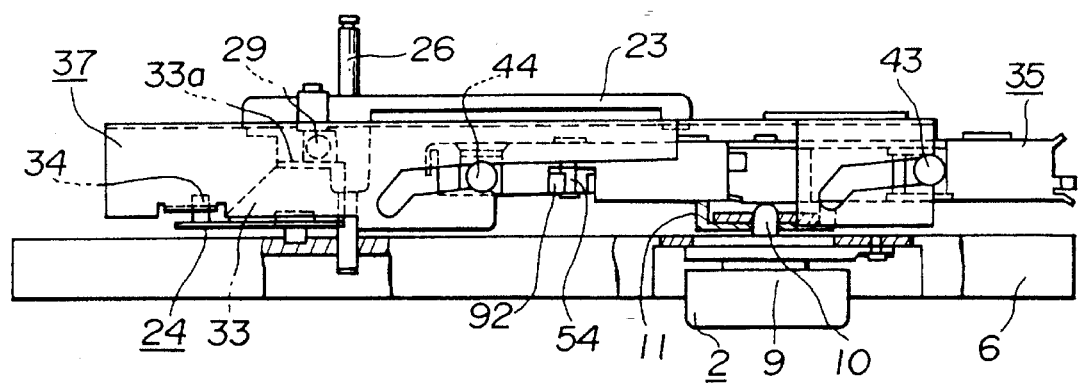
FIG. 17 shows a left side view of the ejecting state of the loading apparatus shown in FIG. 5.

The cartridge holder 35 is formed as a substantially flat plate of a size to hold the disc cartridge 201 therein, and is formed with cartridge holding sections 39, 40 on opposite lateral sides, as shown in FIGS. 9, 13 and 14. The outer lateral sides of the cartridge holding sections 39, 40 are provided with a pair of vertical movement guide pins 41, 42 and another pair of vertical movement guide pins 43, 44 which are adapted for being inserted into and engaged with vertical guide grooves formed in a cartridge holding plate 36 to be later described and in the ejecting plate 37, respectively.

A shutter opening member 47 having a shutter opening pin 46 for opening the shutter member 211 of the disc cartridge 201 introduced into the cartridge holder 35 is provided on an upper plate 45 of the cartridge holder 35. The shutter opening member 47 is a substantially rectangular plate member having arcuate front and rear ends and provided with an elongated slide through-hole 48 which is extended from near its proximal end to its middle portion and which is adapted for being engaged by a guide pin 75 having which in turn has a disk-shaped head end and is secured to cartridge holder 35. Consequently, the shutter opening member 47 may be moved along the slide through-hole 48 with the guide pin 75 as a fulcrum point.

The shutter opening pin 46 is provided at a distal end of the shutter opening member 47 and is projected down into the inside of the cartridge holder 35 via a shutter-opening guide slit 49 formed in the upper plate 45 of the cartridge holder 35. The contour of the guide slit 49 is so formed that the shutter member 211 of the disc cartridge 201 introduced into the cartridge holder 35 is moved in the opening direction as a result of the introducing operation of the disc cartridge 201. The guide slit 49 is includes an inclined starting section 76 inclined with respect to the inserting direction of the disc cartridge 201 shown by line X in FIG. 31 and a rear side straight section 77 substantially parallel to the inserting direction of the disc cartridge 201.

The angle of inclination θ1 of the inclined section 76, with respect to the inserting direction of the disc cartridge 201 is so set that, when the disc cartridge 201 is introduced in an upside-down position, that is when the magnetic disk cartridge 301 containing the magnetic disk 302, such as a floppy disk, is introduced into the cartridge holder 35, such insertion is inhibited positively. That is, the angle of inclination θ1 of the inclined section 76 is selected to be equal to or less than the angle of inclination θ2 of mistaken insertion inhibiting inclined surface 229, 304 provided on the inserting lateral sides of the disc cartridge 201 and the magnetic disk cartridge 301, that is the angle between the inclined surfaces and with respect to the inserting direction of the disc cartridge 201. Consequently, even when the disc cartridge 201 is inserted into the cartridge holder 35 in the upside-down position, the disc cartridge 201 is impinged on the shutter opening pin 46 and prevented from being intruded further into the cartridge holder 35, because the angle of inclination θ2 of the mistaken insertion inhibiting inclined surface 229 is shallower than the angle of inclination θ1 of the inclined section 76. Meanwhile, the ejecting plate holding lever 103 as later explained is not disengaged at a time point when the disc cartridge 201 is impinged on the shutter opening pin 46, so that mistaken insertion of the disc cartridge may be prevented from occurring. Mistaken insertion of the magnetic disk cartridge 301 may be prevented from occurring in a similar manner.

A pin deviation inhibiting member 50 is provided at the proximal end of the shutter opening pin 46. The pin deviation inhibiting member 50 prevents the shutter opening pin 46 from riding on the shutter member 211. The pin deviation inhibiting member 50 is formed as a toroidal-shaped washer of a size large enough to bridge the shutter opening pin guide slit 49. The pin deviation inhibiting member is passed through by the shutter opening pin 46 and kept in contact with an inner surface 45b of the upper plate 45. In this manner, the shutter opening pin 46 is position-controlled by the pin deviation inhibiting member 50 with respect to the guide slit 49 so as to be moved within the guide slit 49 without being deviated out of the cartridge holder 35. Consequently, the shutter opening pin 46 is kept in positive sliding contact with the front surface 209 of the cartridge main body 203 for opening the shutter member 211 without riding on the shutter member 211.

The above-described shutter opening member 47 is rotationally biased by a first tension coil spring 51 in a direction in which the shutter opening pin 46 is moved towards the insertion/ejection opening of the disc cartridge 201, as indicated by arrow J in FIG. 9. That is, as shown in FIG. 13, the first tension coil spring 51 has its one end retained by a first spring retainer 52 formed by segmenting the shutter opening member 47, while having its other end retained by a sixth spring retainer 79 formed by segmenting the cartridge capturing operating lever 57 to be later explained. As a result, the shutter opening pin 46 is maintained at an initial position as a starting position of the guide slit 49 by the first tension coil spring 51.

The upper plate 45 of the cartridge holder 35 is provided with a disc cartridge capturing unit 53 for forcibly capturing the optical disc cartridge 201 into the loading position when the disc cartridge 201 is being introduced into the cartridge holder 35. The disc cartridge capturing unit 53 has a cartridge capturing member 55 having a cartridge capturing pin 54 inserted into and engaged with an engaging recess 228 formed in the disc cartridge 201 and a cartridge capturing operating lever 57 for advancing or receding the cartridge capturing member 55. The cartridge capturing member 55 is engaged with a pair of guide shafts 61, 62 formed on the upper surface 45a of the upper plate 45 of the cartridge holder 35 so as to be advanced or receded with respect to the direction of insertion of the disc cartridge 201 into the cartridge holder 35 as indicated by arrow I in FIG. 13. That is, the cartridge capturing member 55 is formed with reciprocation guide grooves 63, 64 in the form of elongated bent cam slits in which the guide shafts 61, 62 are inserted and engaged to permit reciprocation, that is advancing and receding movement, of the cartridge capturing member 55. The cam profile of the guide grooves 63, 64 is so formed that, in an initial state before a ejection plate holding lever 103 in a locked state is released by the disc cartridge 201 inserted into the cartridge holder 35, the cartridge capturing pin 54 is positioned out of a notch 80 formed in the cartridge holder 35 to prevent the cartridge capturing pin 54 from contacting with the disc cartridge 201 and, directly after disengagement of the ejecting plate holding lever 103, the cartridge capturing pin 54 is intruded into the recess 228 without being contacted with the cartridge holder 35, and subsequently, the disc cartridge 201 is captured towards the rear side of the cartridge holder 35.

That is, bent sections 63a, 64a of the guide grooves 63, 64 play the role of positioning the cartridge capturing pin 54 at a position out of the cartridge holder 35 in the initial state prior to insertion of the disc cartridge 201 into the cartridge holder 35, and of introducing the capturing pin 54 into engagement with the recess 228 directly after disengagement of the ejection plate holding lever 103 by the disc cartridge 201. On the other hand, straight sections 63b, 64b of the guide grooves 63, 64 play the role of capturing the disc cartridge 201 in the disc inserting direction to prevent the capturing member 55 from being contacted with the cartridge holder 35.

The end part of the cartridge capturing member 55 corresponding to the front side of the cartridge holder 35 is provided with an engagement recess 67 in which is engaged a operating engaging pin 69 of the capturing operating lever 57. The recess 67 is formed extending from a lateral side of the capturing member 55 as far as a middle portion of the cartridge holder 53 in a direction perpendicular to the inserting direction of the disc cartridge 201. The other end of the cartridge capturing member 55 has an extension 56 which is bent in the direction of the insertion/ejection opening for the disc cartridge 201. The extension 56 has an intermediate step 59 and has its distal end bent so as to be exposed to outside via the notch 80 formed in the cartridge holding section 40 of the cartridge holder 35. A cartridge capturing pin 54 is formed on the foremost part of the extension 56 for capturing the disc cartridge 201 into the cartridge holder 35.

The distance y from the center of the cartridge capturing pin 54 to a step surface 59a of the step 59 of the extension 56 along the disc inserting direction is related to the distance x (as shown in FIG. 3) from front side 209 of the disc cartridge 201 to the center of the recess 228 for cartridge capturing pin by y=x+δ, that is the distance y is slightly longer than the distance x. The result is that the front side 209 of the disc cartridge 201 is first contacted with the step surface 59a of the extension 56 before the cartridge capturing pin 54 is intruded into the recess 228. This assures positive engagement of the cartridge capturing pin 54 to permit the disc cartridge 201 to be positively captured into the inside of the cartridge holder 35. Meanwhile, the value δ in the above formula is changed with the diameter of the cartridge capturing pin 54.

The cartridge capturing operating lever 57 is in the form of a flat Y-shaped plate having its middle portion rotatable fulcrumed on the upper surface 45a of the upper plate 45 of the cartridge holder 35 by a third pivot shaft 68. The cartridge capturing operating lever 57 is a trifurcate lever having three legs of different lengths 58, 59, 60 extending in three directions from the third pivot shaft 68. The operating engaging pin 69 engaged in the recess 67 of the cartridge capturing member 55 is set at the distal end of the longest arm 58. A rotation operating engaging pin 72, adapted for being engaged with the ejecting plate 37, to be later described for rotating the cartridge capturing operating lever 57 by the ejecting plate 37, is set on the distal end of the second longest leg 59, whilst a sixth spring retainer 79 for retaining the end of the first tension coil spring 51 retained at the other end by the shutter opening member 47 is formed at the leg 59. A fourth spring retainer 71 for retaining one end of a second coil spring 70 adapted for sliding the cartridge capturing member 55 in the direction of insertion of the disc cartridge 201 is formed at the distal end of the remaining leg 60.

The second tension coil spring 70, having its one end retained by the fourth spring retainer 71, is provided for extending in a direction substantially at right angles to the direction of insertion of the disc cartridge 201 into the cartridge holder 35. That is, the second tension coil spring 70, placed between fifth spring retainer 73 formed by segmenting a part of the lateral side of the cartridge holder 35 in the vicinity of the disc inserting/ejection opening and fourth spring retainer 71 of the cartridge capturing operating lever 57, is extended substantially at right angles to the direction of insertion of the disc cartridge 201. Consequently, the cartridge capturing member 55 is rotationally biased by the cartridge capturing operating lever 57 in the direction of insertion of the disc cartridge 201, under the bias of the second tension coil spring 70, as shown by arrow J in FIG. 9. By arranging the second tension coil spring 70, adapted for forcibly capturing the disc cartridge 201, in an orientation substantially at right angles to the direction of insertion of the disc cartridge 201, the second recess 84 in the cartridge holder 35 facing the magnetic head device 5 may be increased in size to preserve a sufficient spacing for the magnetic head device 5. On the other hand, the amount of displacement of the second tension coil spring may be diminished because of a shorter distance between the fulcrum point of rotation of the cartridge capturing operating lever 57 and the fourth spring retainer 71. Consequently, the disc cartridge 201 may be captured into the inside of the cartridge holder 35 at a substantially constant force at all times.

Meanwhile, at the initial mounting state of the second tension coil spring 70, the cartridge capturing pin 54 of the cartridge capturing member 55 engaged with the cartridge capturing operating lever 57 is at a predetermined loading position. On the other hand, a levelling inhibiting member 74 is provided in a region of the upper plate section 45 of the cartridge holder 35 traversed by the rotation operating engaging piece 72 by rotation of the cartridge capturing operating lever 57 for preventing the cartridge holder 35 from being leveled inwardly during movement of the rotation operating engaging piece 72. The levelling inhibiting member 74 is formed by raising a part of the upper surface 45a of the upper surface section 45.

The upper plate 45 of the cartridge holder 35 has a first recess 83 faced by the ejection plate holding lever 103 holding the ejection plate 37 in an ejecting position and a second recess 84 faced by the head device 5. A cartridge pressing member 89 for pressing the disc cartridge 201 inserted into the cartridge holder 35 towards the disc table 35 to prevent the disc cartridge 201 from riding on the pin deviation inhibiting member 50 provided on the shutter opening pin 46 is formed by partially raising an inner surface 45b of the upper plate section 45 of the cartridge holder 35, as shown in FIG. 14. The cartridge pressing member 89 is provided in the vicinity of the shutter opening pin 46 in its initial position and has a height at least equal to the plate thickness of the pin deviation inhibiting member 50 for positively preventing the disc cartridge 201 from riding on the pin deviation inhibiting member 50.

The upper plate 45 of the cartridge holder 35 is provided with inserting position controlling members 90, 91 for position-controlling the disc cartridge 201 so that the disc cartridge inserted into the cartridge holder 35 is not intruded more inwardly than the loading position. The inserting position controlling members 90, 91 are formed by bending a part of the cartridge holder 35 in the vicinity of an opening edge of the second recess 84 along the rear edge of the upper plate 45. The outer lateral side of the cartridge holding section 40 of the cartridge holder 35 is formed with the notch 80 which plays the role of deviating the cartridge capturing pin 54 outward in the ejecting state in order to prevent the cartridge capturing pin 54 from being contacted with the disc cartridge 201 introduced into the cartridge holder 35.

Figure 8:
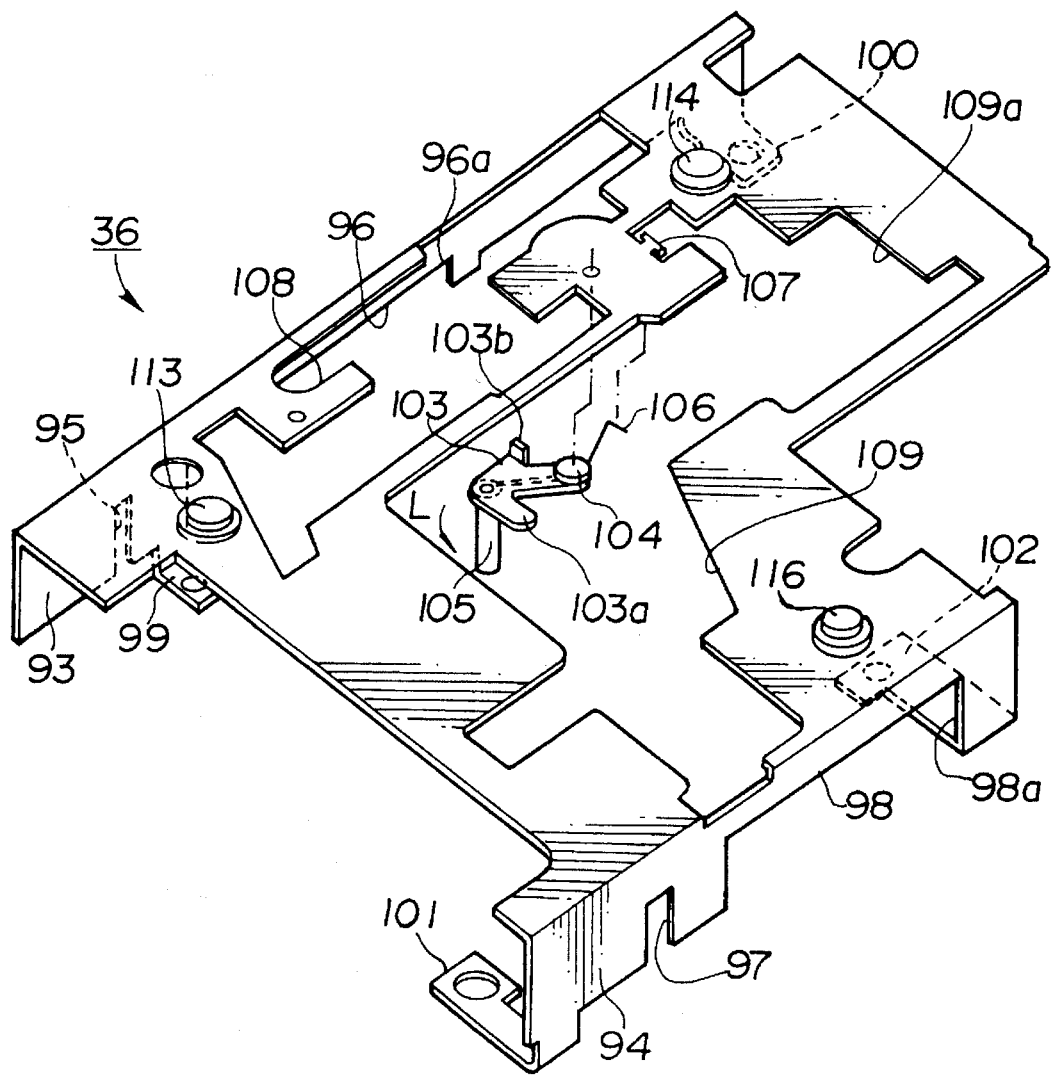
FIG. 8 shows a perspective view of a cartridge holder supporting plate of the loading apparatus shown in FIG. 5.

The cartridge holder supporting plate 36 supporting the cartridge holder 35 is formed as a casing of a size large enough to hold the cartridge holder 35 therein, and is formed with cartridge holder supporting wall sections 93, 94 on its both sides for vertically movably supporting the cartridge holder 35, as shown in FIG. 8. These supporting wall sections 93, 94 are formed with vertical movement guide pins 95, 97, 96, 98 in which the vertical movement guide pins 41 to 44 of the cartridge holder 35 are introduced and engaged or slid. Of these guide grooves 95 to 98, the guide grooves 95, 97 provided towards the inserting/ejecting opening of the disc cartridge 201 are formed as slits having a width to permit the guide pins 41, 43 to be passed therethrough and extended parallel to the spindle shaft 10 of the disc driving and rotating device 2. The vertical movement guide grooves 96, 98 are of a wider width and formed parallel to the spindle shaft 10 of the disc rotating and driving device 2. In these guide grooves 96, 98 of the wider widths, the inner vertical movement guide grooves 42, 44 are adapted to be engaged in sliding contact with the rear sides 96a, 98a of the guide grooves 96, 98. That is, the vertical movement guide pins 41, 43 provided towards the insertion/ejection opening of the disc cartridge 201 are inserted into and engaged with the vertical guide grooves 95, 97, whilst the inner vertical movement guide grooves 96, 98 are engaged in sliding contact with the lateral edges 96a, 98a of the opposite side vertical movement guide groves 96, 98. On both lateral sides on the lower ends of the supporting wall sections 93, 94 formed with the guide grooves 95 to 98, attachment sections 99, 100, 101, 102 are mounted for being extended inward for securing the cartridge holder supporting plate 36 to the base plate 6. That is, the cartridge holder supporting plate 36 is secured to the base plate 6 by screwing the attachment sections 99 to 102 to the base plate 6.

The ejection plate holding lever 103 for holding the ejection plate 37 at the ejecting position against the bias of the tension coil spring as later explained is rotatable mounted on the cartridge holder supporting plate 36. The ejecting plate holding lever 103 is rotatable mounted by having its proximal end supported by a fifth supporting shaft 104. An engaging pawl 103a engaged with an ejecting plate retention member provided on the ejecting plate 37 for holding the ejecting plate 37 at an ejecting position is provided at a distal end of the ejecting plate holding lever 103. A pin 105 for rotating the ejecting plate holding lever 103 is formed on the proximal end of the lever 103 provided with the engaging pawl 103a. The pin 105 depends into the inside of the cartridge holder 35 via the recess 83 formed on one side of the cartridge holder 35. The distal end of the pin 105 is adapted for depending at least to a position of abutting on the disc cartridge 201 inserted into the cartridge holder 35.

The ejecting plate holding lever 103 is rotationally biased by the second tension coil spring 106 in a direction of moving the pin 105 in a direction of opposing to the insertion of the disc cartridge 201, as shown by arrow L in FIG. 8. That is, the second tension coil spring 106 has its one end retained by the proximal end of the pin 105, while having its other end retained by an eighth spring retainer 107 formed by segmenting a part of the cartridge holder supporting plate 36. With the retention pawl 103a disengaged from ejection plate retention member 107, the ejecting plate holding lever 103 is controlled in its rotation by a lever rotation inhibiting piece 103b formed by segmenting the ejecting plate holding lever 103 so as to be engaged and retained by the cartridge holder supporting plate 36.

Meanwhile, the cartridge holder supporting plate 36 is provided with a third recess 108, faced by a part of the cartridge capturing member 55, a fourth recess 109 faced by the magnetic head device 5, and ejecting plate sliding pins 113, 114 and 116 for sliding the ejecting plate 37 in the inserting and ejecting direction of the disc cartridge 201. By arranging the second coil spring 70 substantially at right angles to the inserting direction of the disc cartridge, the fourth recess 109 has an opening area large enough to permit vertical movement of the magnetic head device 5.

Figure 10:
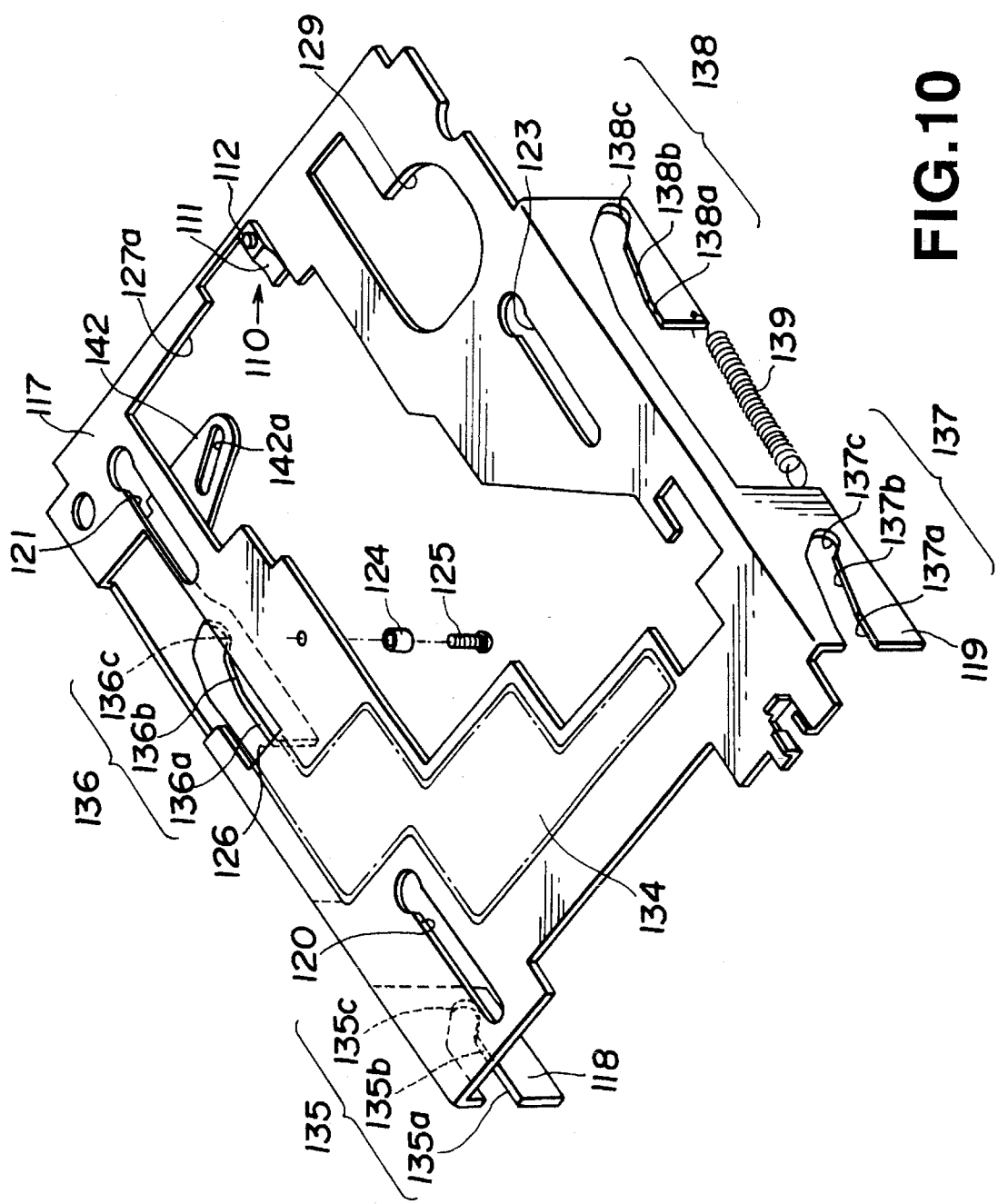
FIG. 10 shows a perspective view of an arrangement of an ejecting plate of the loading apparatus shown in FIG. 5.

The ejecting plate 37 is slidable mounted with respect to the above-described cartridge holder supporting plate 36. The ejecting plate 37 includes a sliding section 117 in the form of a flat plate slidingly contacted with the cartridge holder supporting plate 36 and upstanding wall sections 118, 119 depending from both opposite sides of the slide section towards the disc rotating and driving device 2, as shown in FIG. 10. The slide section 117 has slide slits 120, 121 and 123 passed through by the ejecting plate sliding pins 113, 114 and 116 provided on the cartridge holder supporting plate 36. The slide slits 120, 121 and 123 are formed in register with the ejecting plate sliding pins 113, 114 and in the form of elongated openings extending in the inserting and ejecting direction of the disc cartridge 201.

The sliding section 117 has a retention member 124 engaged with the ejecting plate holding lever 103 provided on the cartridge holder supporting plate 36. The retention member 124 is a cylinder of a size to be retained by an engaging pawl 103a of the ejecting plate holding lever 103 and is rotatable mounted on the sliding section 117 by a screw 125 in a drilled hole in the middle portion of the cylinder.

The sliding section 117 is provided with a fifth recess 126 faced by a part of the cartridge capturing member 55, a sixth recess 127 faced by the magnetic head device 5 and a seventh recess 128 faced by a rotation operating engaging piece 72 of the cartridge capturing engaging lever 57 provided on the cartridge holder 35. A magnetic head device holding unit 110 for holding the magnetic head device 5 at a predetermined height with respect to the signal recording surface of the optical disc 202 when the magnetic head device 5 is at the recording position proximate to the optical disc 202 is provided at an inner lateral side 127a of the sixth recess 127 for intruding into the recess 127. The magnetic head device holding unit 110 consists in a flexible plate spring having a U-shaped distal end which is engaged with an engaging surface 23a provided on the lifting frame member 23 for thrusting and holding the lifting frame member 23 when the magnetic head device 5 is moved to a recording position proximate to the optical disc 202. Meanwhile, the plate spring 111 is secured to the ejecting plate 37 by having its proximal end secured by screw 112. Meanwhile, the seventh recess 128 has its lateral side 128a towards the inserting/ejecting opening engaged by the rotation operation engaging piece 72 protruded into the recess 128 when the ejecting plate 37 is slid to the ejecting position for rotating the cartridge capturing operating lever 57.

At back of the seventh recess 128, into which the disc cartridge 201 is inserted, there is formed an operating opening 129 passed through by an ejecting plate sliding pin 130 of an ejecting plate sliding driving unit 38 adapted for sliding the ejecting plate 37 to the ejecting position. The operating opening 129 has the shape of a letter b the rim of which is engaged by the ejecting plate sliding pin 130.

The ejecting plate driving unit 38 is included with an ejecting motor, not shown, provided below the base plate 6, and an ejecting plate operating gear 131 rotationally driven by the ejecting motor and having the ejecting plate sliding pin 130, as shown in FIG. 6. The ejecting motor and the ejecting plate operating gear 131 are connected by a connection gear device 132. The ejecting plate sliding pin 130 is provided at an offset position of the ejecting plate operating gear 131. In the ejecting plate driving unit 38, when the ejecting operating button, not shown, is actuated for driving the ejecting motor for rotationally driving the ejecting plate operating gear 131, with the disc cartridge 201 loaded on the cartridge loading section 1, the ejecting plate sliding pin 130 is slidingly engaged with the rim of the opening of the operating opening 129 of the ejecting plate 37 for sliding the ejecting plate 37 against the bias of the tension coil spring 70 placed on the cartridge capturing operating lever 57 and a tension coil spring placed between the ejecting plate 37 and the base plate 6 as later described for sliding the ejecting plate 37 to its ejecting position. It is noted that the ejecting plate sliding pin 130 is rotated to a position of not being slidingly contacted with the opening rim of the operating opening 129 when the ejecting plate 37 is not in the ejecting position. A raised part 134 formed by partially raising the sliding section 117 at a portion of the side section 117 extending from a lateral side towards the inserting/ejecting opening of the disc cartridge 201 to a portion facing the cartridge capturing member 55.

The upstanding wall sections 118, 119, provided on opposite lateral sides of the slide section 117, are formed with vertical movement slide grooves 135, 136, 137 and 138 for vertically moving the cartridge holder 35 with respect to the cartridge loading section 1 and for moving the cartridge holder to a position of ejecting the disc cartridge 201. These vertical movement slide grooves 135, 136, 137 and 138 are made up of horizontal sections 135a, 136a, 137a and 138a, extending parallel to the inserting/ejecting direction of the disc cartridge 201, first inclined sections 135b, 136b, 137b and 138b gradually descending from the horizontal sections 135a, 136a, 137a and 138a towards rear and second inclined sections 135c, 136c, 137c and 138c inclined acutely downwardly towards rear. The cartridge holder 35, supported by the chassis base plate 6 with the vertical movement guide pins 41, 42, 43 and 44 passed through the vertical movement guide grooves 135, 136, 137 and 138, has its vertical movement guide pins 41 to 44 guided by the guide grooves 135 to 138 so that the cartridge holder is moved axially of the spindle shaft 10 of the disc rotating and driving device 2, that is vertically with respect to the cartridge loading section 1, while being moved to the ejecting position of ejecting the disc cartridge 201.

Fourth tension coil springs 139, 139 for perpetually basing the ejecting plate 37 towards the inserting/ejecting opening for the disc cartridge 201 are provided in the vicinity of inner vertical slide grooves 136, 138 of the upstanding wall sections 118, 119 along which the disc cartridge 201 is inserted. In the drawing, only one of the coil springs 139 is shown. These tension coil springs 139,139 have one ends retained by the upstanding wall sections 118, 119, while having the other ends retained by spring retention pins 140, 141 set on the base plate 6, for perpetually biasing the ejecting plate 37 towards the inserting/ejecting opening for the disc cartridge 201. On the inner side of the upstanding wall 118, in which the disc cartridge 201 is inserted, an operating member 142 for operating the frame lifting lever 24 is provided for being engaged in a lever operating pin 34 of the frame lifting lever 24 rotatable supported by the base plate 6 for rotationally operating the frame lifting lever 24. The operating member 142 for the frame lifting lever 24 is mounted extending from a lower lateral side of one of the upstanding wall sections 118 towards the other upstanding wall section 119 in parallel to the slide section 117. A guide groove 142a for the lever operating pin 34 is formed in the vicinity of the distal end of the operating member 142 in the form of an elongated groove. The lever operating pin 34 is engaged in the guide groove 142a of the operating member 142. The lifting lever 24 for lifting the lifting frame member 23 is rotated by engagement of the lever operating pin 34 in the guide groove 142a of the operating lever 142 and by sliding of the ejecting plate 37 so that the lifting frame member 23 is moved in the perpendicularly direction of the optical disc 202 and the position of closing the major surface of the optical disc 202 and the position of going away the major surface of the optical disc 202.

The state of operation of loading the disc cartridge 201 on the above-described disc recording and/or reproducing apparatus is explained.

The state before to loading of the disc cartridge 201 is explained. For loading the disc cartridge 201, an ejecting button, not shown, is actuated for moving the ejecting plate 37 to the ejecting position, as shown in FIGS. 15 to 18, for moving the cartridge holder 35 and the lifting frame member 23 fitted with the magnetic head 20 to a raised position spaced apart from disc table 11 of the disc rotating and driving device 2.

That is, the ejecting plate driving unit 38 is driven by operating the ejecting button. The ejecting plate sliding pin 130 of the ejecting plate sliding unit 38 is slidingly engaged with the operating opening 129 formed in the ejecting plate 37 so that the ejecting plate 37 is slid in the inserting direction of the disc cartridge 201 against the bias of the fourth tension coil springs 39 provided between the ejecting plate 37 and the base plate 6 and the tension coil spring 70 retained by the cartridge capturing operating lever 57. The ejecting plate holding lever 103 of the cartridge holder supporting plate 36 is engaged with the retention member 124 provided on the ejecting plate 37 for holding the ejecting plate 37 in the ejecting position.

On the other hand, with the sliding of the ejecting plate 37, the rotation operating engaging piece 72 of the cartridge capturing operating lever 57 protruded into and engaged with the seventh recess 128 of the ejecting plate 37 is captured towards the inserting side of the disc cartridge 201. The cartridge capturing member 55 connected to the cartridge capturing operating lever 57 is slid towards the inserting/ejecting opening of the disc cartridge 201 for holding the cartridge capturing pin 54 provided at the distal end of the cartridge capturing member 55 at a position deviated from the recess 80 of the cartridge holder 35. Consequently, in the ejecting state, the cartridge capturing pin 54 is kept out of contact with the disc cartridge 201 introduced into the cartridge holder 35. Meanwhile, the shutter opening pin 46 is set to an initial position by the first tension coil spring 51 provided between the shutter opening member 47 and the cartridge capturing operating lever 57.

Figure 18:
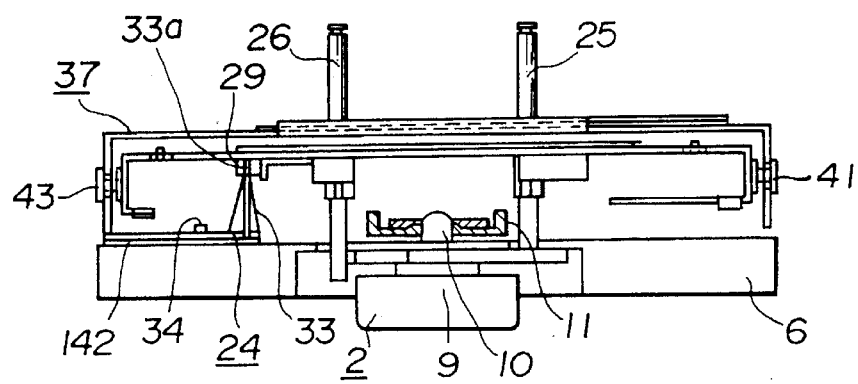
FIG. 18 shows a front view of the ejecting state of the loading apparatus shown in FIG. 5.

With further sliding of the ejecting plate 37, the operating member 142 provided on the ejecting plate 37 is engaged with the frame lifting lever 24 for rotating the frame lifting lever 24 for moving the lifting frame member 23 to a raised position spaced apart from the disc table 11 of the disc rotating and driving device 2 shown in FIG. 18. At this time, the lifting frame member 23 is maintained in the loaded position in the recording position by the plate spring 111 provided on the ejecting plate 37 thrusting the engaging surface 23a of the lifting frame member 23. However, the engaged condition is released by rearward sliding of the ejecting plate 37 so that the lifting frame member 23 is raised only against its own gravity, so that the load on the motor of the ejecting plate driving unit 38 lifting the lifting frame member 23 is reduced to enable the motor of a smaller output to be used.

When the lifting frame member 23 is brought to its raised position, that is to the ejecting position, the lifting engaging pin 29 of the lifting frame member 23 is engaged with the parallel portion 33b of the vertical movement guide section 33 of the frame lifting lever 24 so that the magnetic head 20 is held at a position out of conflict with the disc cartridge 201 at least when the disc cartridge 201 is inserted.

Figure 19:
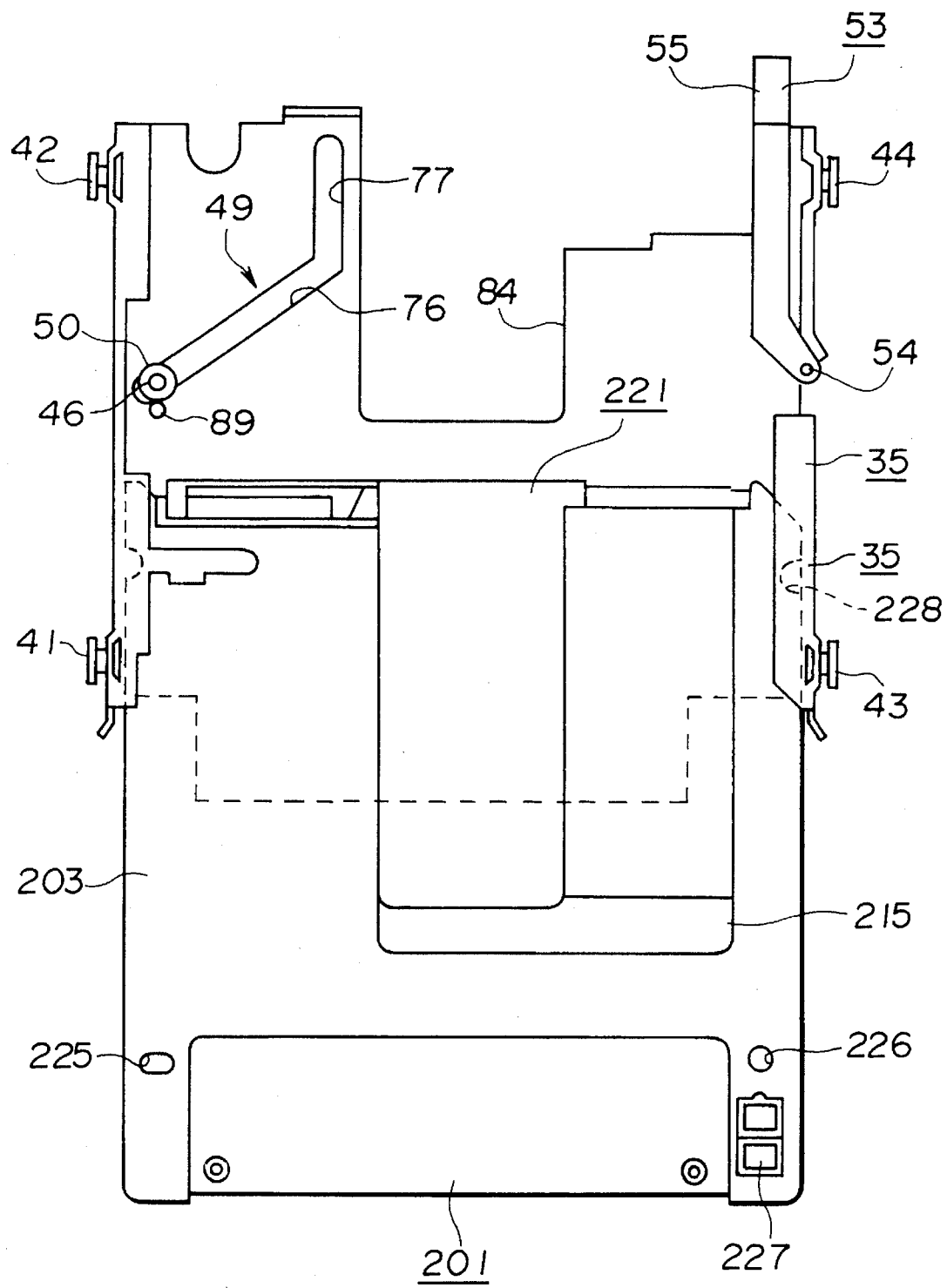
FIG. 19 shows a plan view of a state of initial insertion of the disc cartridge into the cartridge holder.
Figure 20:
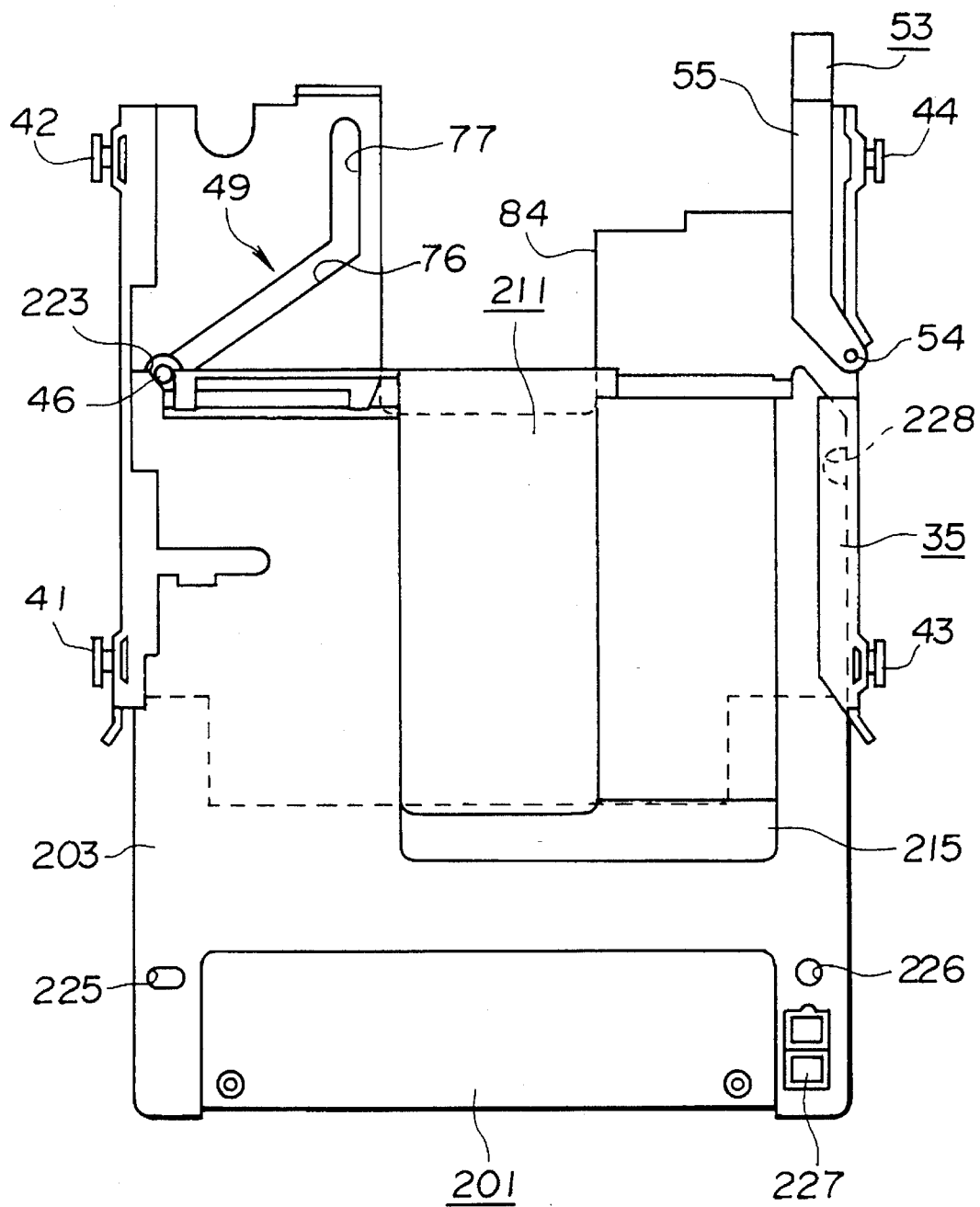
FIG. 20 shows a plan view a state of engagement of the disc cartridge in the cartridge holder in the loaded state.
Figure 21:
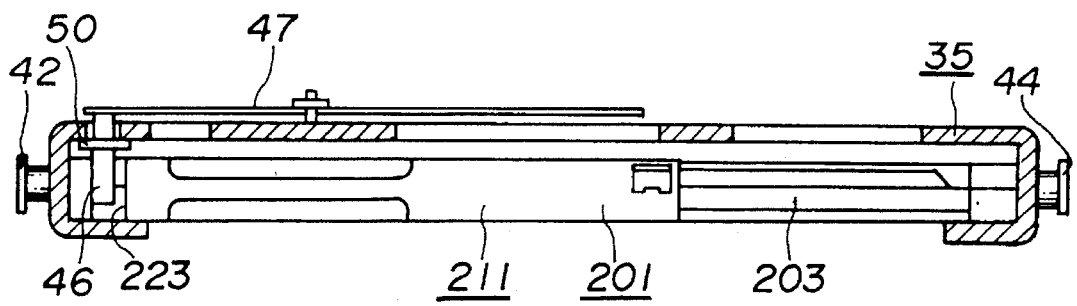
FIG. 21 shows a cross-sectional view of a state of insertion of the shutter opening pin into the disc cartridge.
Figure 22:
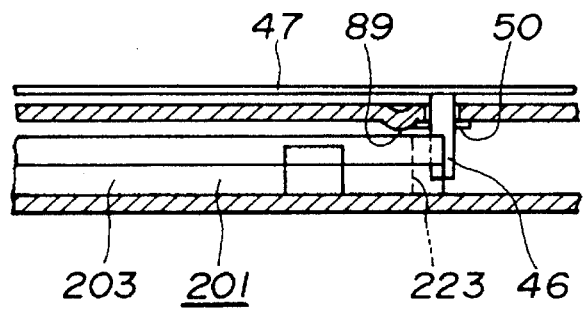
FIG. 22 shows a schematic cross-sectional view of the state of insertion of the shutter opening pin into the disc cartridge.
Figure 23:
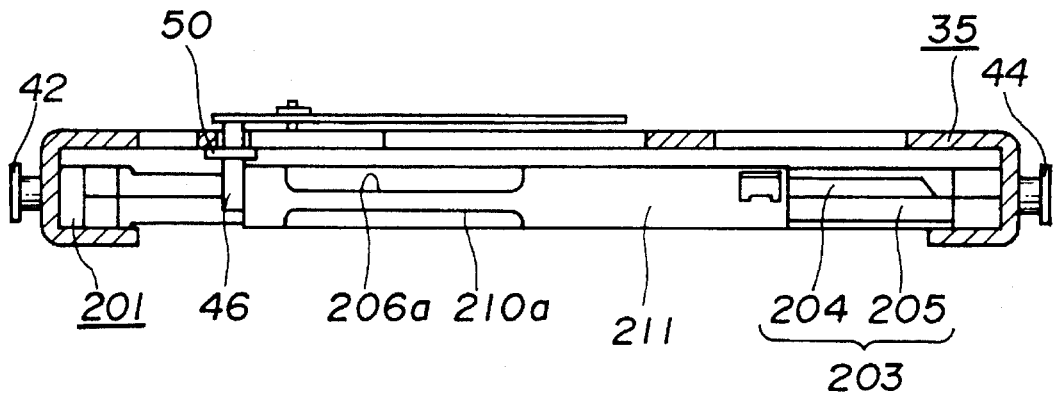
FIG. 23 shows a cross-sectional view of a state of engagement of an ejection plate holding lever rotating pin with the disc cartridge.

The disc cartridge 201 is inserted in this state from the front side into the cartridge holder 35 in the regular direction as shown in FIG. 19. When the disc cartridge is inserted further inward shown in FIG. 20, the shutter opening pin 46 abuts on the front surface 209 of the cartridge main body 203. When the shutter opening pin 46 is caused to bear on the front surface 209 in this manner, the disc cartridge 201 is pressed down towards the disc table 11 by the cartridge pressing member 89 provided on the upper plate 45 of the cartridge holder 35 for facing the shutter opening pin 46, in such a manner that the disc cartridge 201 is prevented from riding on the pin deviation inhibiting member 50 provided on the shutter opening pin 46, as shown in FIG. 23.

Figure 31:
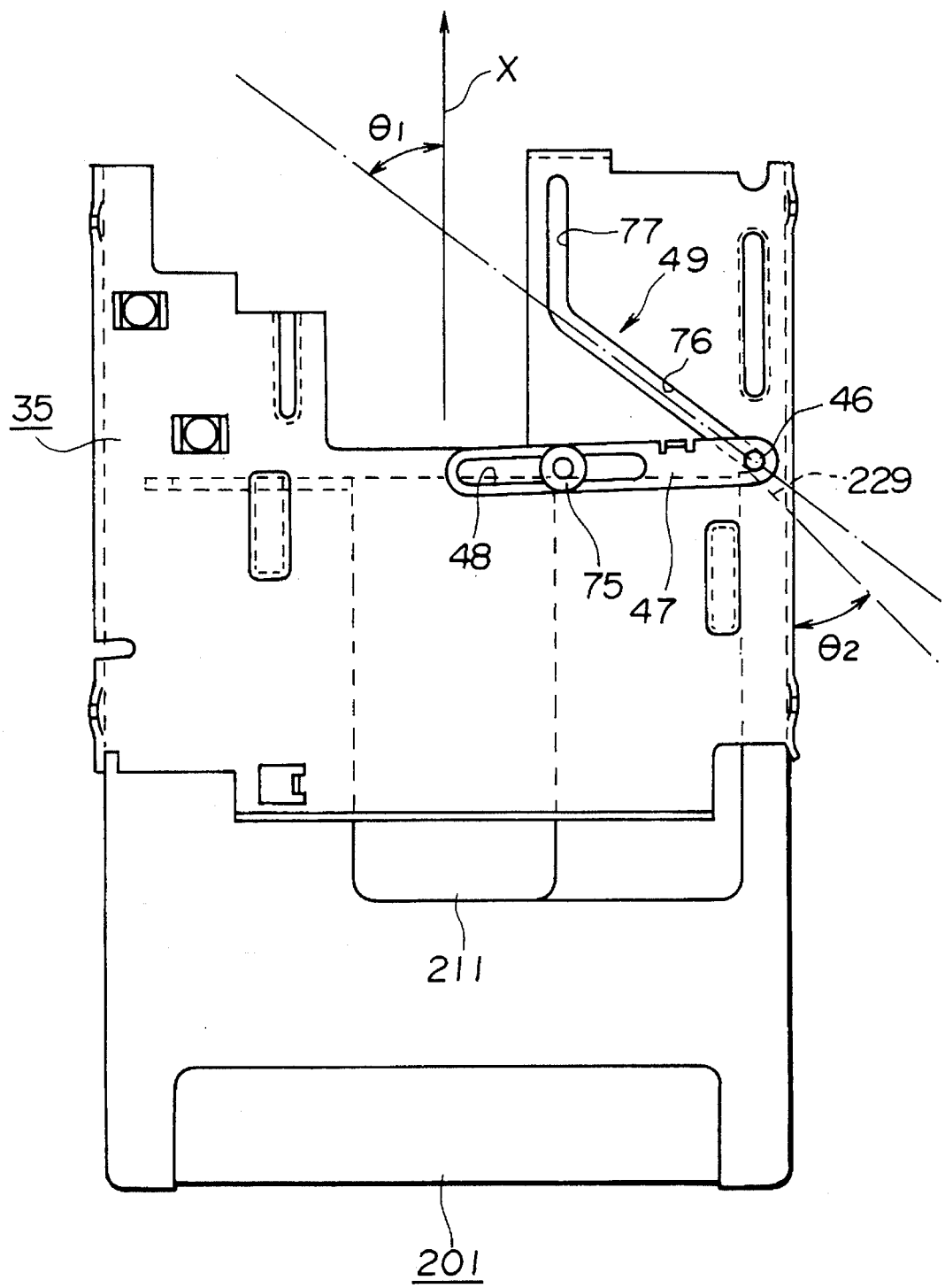
FIG. 31 shows a plan view of a state in which the disc cartridge is inserted into the cartridge holder in the upside-down state.

If the disc cartridge 201 is inserted into the cartridge holder in an upside-down position, as shown in FIG. 31, since the angle of inclination θ1 of the inclined section 76 of the guide groove 49 is selected to be equal to or greater than the angle of inclination θ2 of the inclined surface 229, the disc cartridge 201 is impinged on the shutter opening pin 46 to inhibit further insertion of the disc cartridge 201. That is, if the disc cartridge 201 is inserted in the upside-down position, the disc cartridge 201 may be automatically discarded before being captured into the disc recording and/or reproducing apparatus. Mistaken insertion of the magnetic fisk cartridge 301 housing a magnetic disk such as a floppy disk may be inhibited in similar manner.

Figure 24:
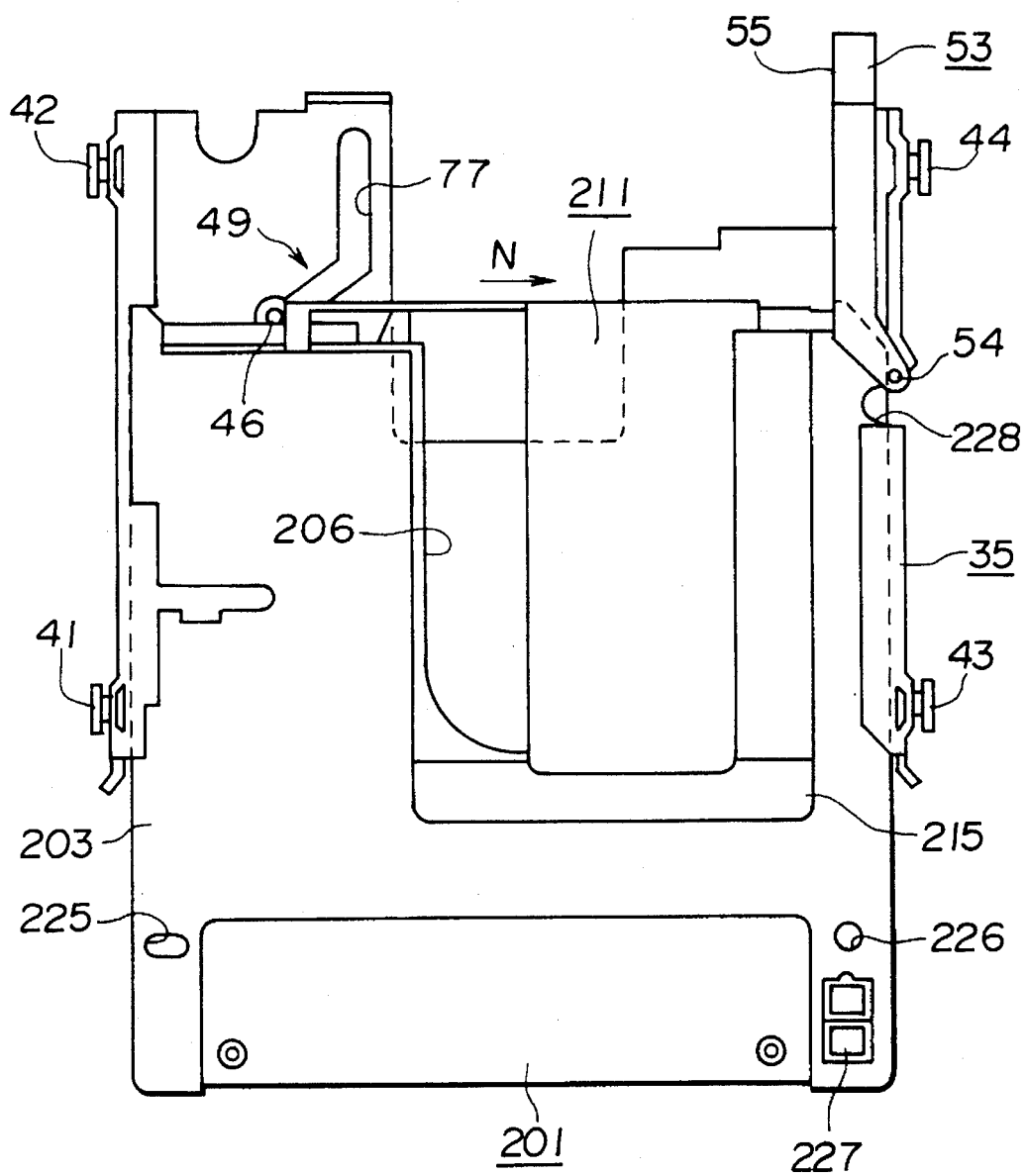
FIG. 24 shows a plan view of a state of an opening operation of the shutter member by the shutter opening pin.

If the disc cartridge 201 is inserted further into the cartridge holder 35 from this state, one end of the shutter member 211 is caused to bear on the shutter opening pin 46, as shown in FIG. 24, so that the shutter member 211 is moved by the shutter opening pin 46 in a direction of opening the openings 206, 210 of the disc cartridge 201, as shown by arrow N in FIG. 24, against the bias of the torsion coil spring provided in the cartridge main body 203. Since the shutter opening pin 46 is position-controlled at this time by the inhibiting member 50 with respect to the guide groove 49, the shutter opening pin 46 positively opens the shutter member 211 without riding on the shutter member 211.

When the disc cartridge 201 is inserted further into the cartridge holder 35, the ejecting plate holding lever rotating pin 105 for the ejecting plate holding lever 103 rotatable mounted on the cartridge holder supporting plate 36 is caused to bear on the distal end of the disc cartridge 201 to rotate the lever 103 in a direction shown by arrow O in FIG. 24 for disengaging the lever 103 from the ejecting plate retention member 124 provided on the ejecting plate 37. The result is that the ejecting plate 37 is unlocked so that the ejecting plate 37 is slid towards the inserting and ejecting opening for the disc cartridge 201 by the fourth tension coil spring 139 mounted under tension between the ejecting plate 37 and the base plate 6.

Simultaneously, the edge 128a of the recess 128 in the ejecting plate 37 disengages the engaging piece 72 from the capturing operating lever 57. The cartridge capturing operating lever 57 is then pulled by the second tension coil spring 70 and thereby rotated about the third supporting shaft 68 as the center of rotation. By such rotation of the cartridge capturing operating lever 57, the cartridge capturing member 55 is slid along the bends 63a, 64a of the guide grooves 63, 64 formed in the cartridge capturing member 55. That is, the cartridge capturing member 55 is slid obliquely forward from the edge of the cartridge holding section 40. The result is that the cartridge capturing pin 54 provided at the distal end of the cartridge capturing member 55 is moved along the contour of the bends 63a, 64a of the guide grooves 63, 64 from the initial state in which the pin is retained outside of the cartridge holder 35 towards the inside thereof so as to be engaged in the matting hole opening 228 provided in the disc cartridge 201.

Figure 25:
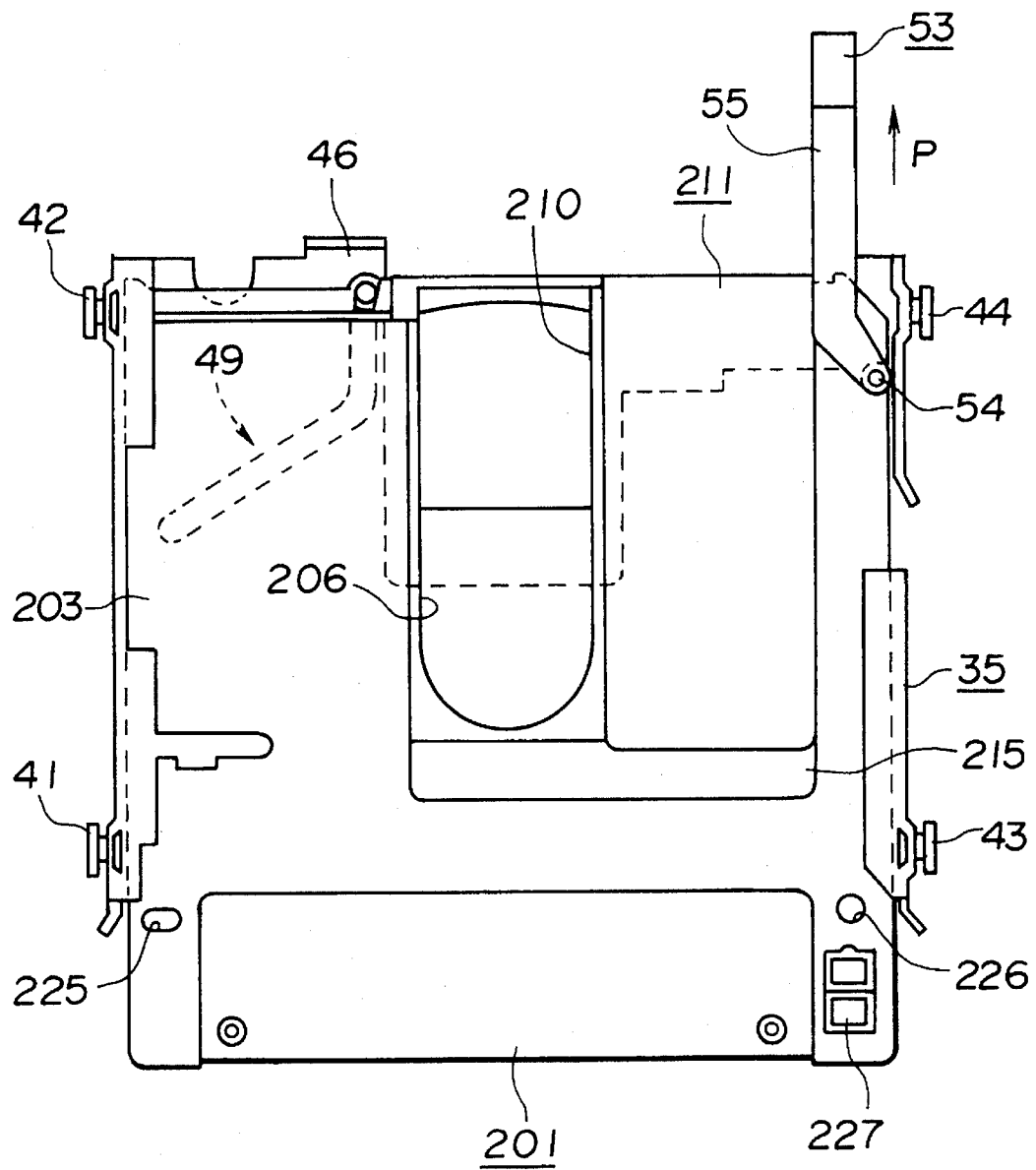
FIG. 25 shows a plan view of a state of end of the opening operation of the shutter member by the shutter opening pin.
Figure 26:
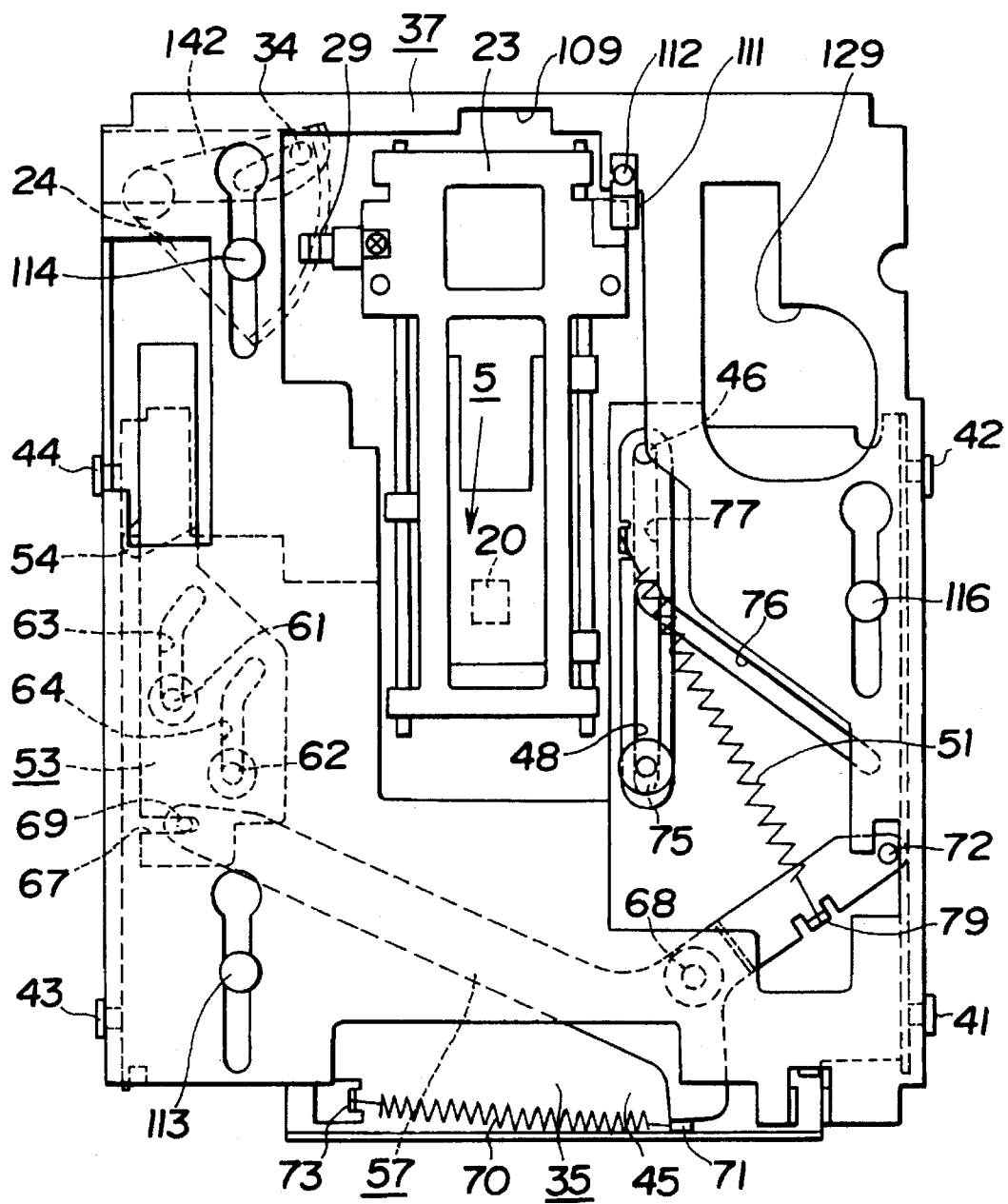
FIG. 26 shows a plan view of a loading state of the loading apparatus shown in FIG. 5.

The cartridge capturing member 55 is then slid along the contour of the straight sections 63b, 64b of the guide grooves 63, 64 along the direction of insertion of the disc cartridge 201. The result is that the disc cartridge 201 is captured by the cartridge capturing pin 54 provided at the distal end of the cartridge capturing member 55 in the direction of disc insertion as shown by arrow P in FIG. 25. Ultimately, the disc cartridge 201 is positioned at the inner most position of the disc cartridge 35 for fully opening the first and second openings 206, 210 provided in the disc cartridge 201.

As the ejection plate 37 is moved in this manner, the cartridge holder 35 descends along the axis of the spindle shaft 10 of the disc rotating and driving device 2, by the vertical movement guide pins 41, 42, 43 and 44 being guided by the vertical movement slide grooves 135, 136, 137 and 138 provided in the ejecting plate 37, as shown in FIGS. 25 to 29. That is, when the guide pins 41 to 44, guided by the guide grooves 135 to 138, are engaged in the acutely downwardly inclined second inclined sections 135c, 136c, 137c and 138c of the slide grooves 135, 136, 137 and 138 the cartridge holder 35 descends along the vertical movement guide grooves 95, 96, 97 and 98 provided in the cartridge holder supporting plate 36. The result is that the disc cartridge 201 is loaded in position on the cartridge loading section 1. At this time, the disc cartridge 201 is held at a predetermined height by being position-controlled by the height position setting pins 7a, 8a and disc cartridge position setting pins 7, 8 provided on the base plate 6. Simultaneously, the optical disc 202 housed within the disc cartridge 201 is loaded on the disc table 11.

Figure 27:
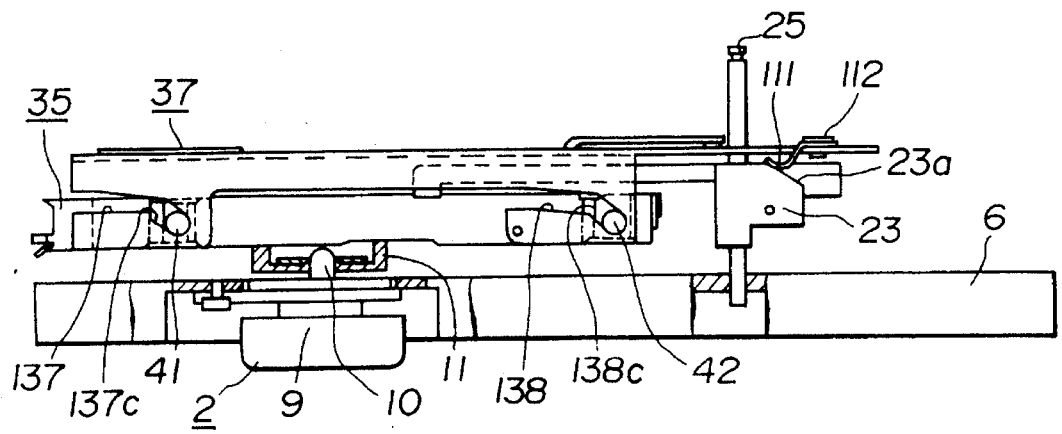
FIG. 27 shows a right side view of the loading state of the loading apparatus shown in FIG. 5.
Figure 28:
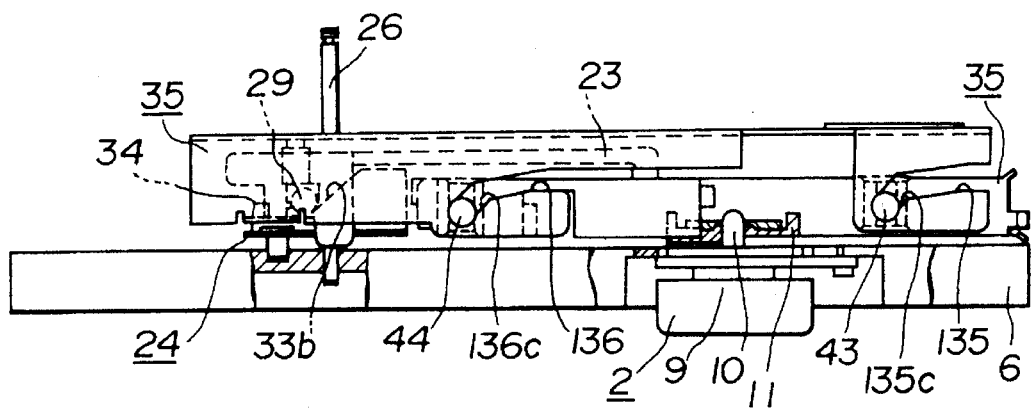
FIG. 28 shows a left side view of the loading state of the loading apparatus shown in FIG. 5.
Figure 29:
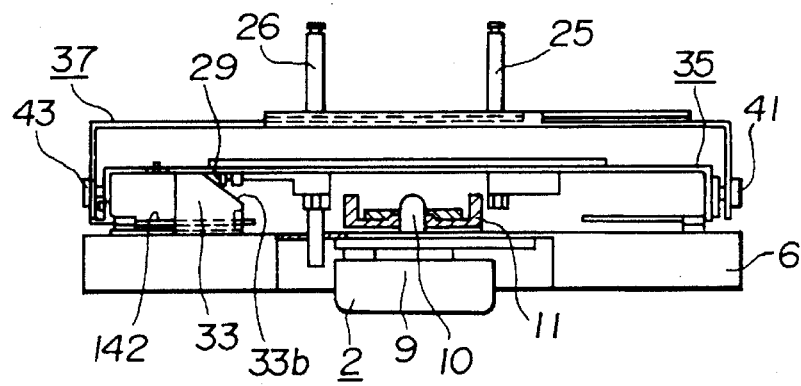
FIG. 29 shows a front view of the loading state of the loading apparatus shown in FIG. 5.

When the ejection plate 37 is moved in the above-described manner, the operating member 142 provided on the ejecting plate 37 is engaged with the frame lifting lever 24 for rotating the frame lifting lever 24 so that the lifting member 23 is moved downward along the axis of the spindle shaft 10 of the disc rotating and driving device 2, as shown in FIGS. 27 and 28. When the lifting frame member 23 is lowered in this manner, the spring plate 111 provided on the ejecting plate 37 is engaged with the engaging surface 23a of the lifting frame member 23 for thrusting the lifting frame member 23. The result is that the magnetic head 20 supported for movement by the frame member 23 faces the opening 210 of the disc cartridge 201 and is held at a position facing the optical pickup device 4 at a predetermined height with respect to the signal recording layer of the optical disc 202 housed within the disc cartridge 201 for enabling recording/playback of the information signals.

Meanwhile, in the above-described disc recording and/or reproducing apparatus, since the frame member 23 for lifting the magnetic head is thrust by the spring plate 11 provided on the ejecting plate 37 only when information signals are recorded/reproduced on or from the optical disc 202, it is possible to maintain the magnetic head 20 during recording/playback at a predetermined position with respect to the optical disc 202 not only when the optical disc 202 is horizontal with respect to a horizontal but also when it is vertical with respect to the horizontal. That is, recording or playback on or from the optical disc may be performed satisfactorily even when the apparatus is laden on the car.

The present invention may be modified from the above-described embodiment of the automatic cartridge capturing mechanism in the disc recording and/or reproducing apparatus.

Figure 30:
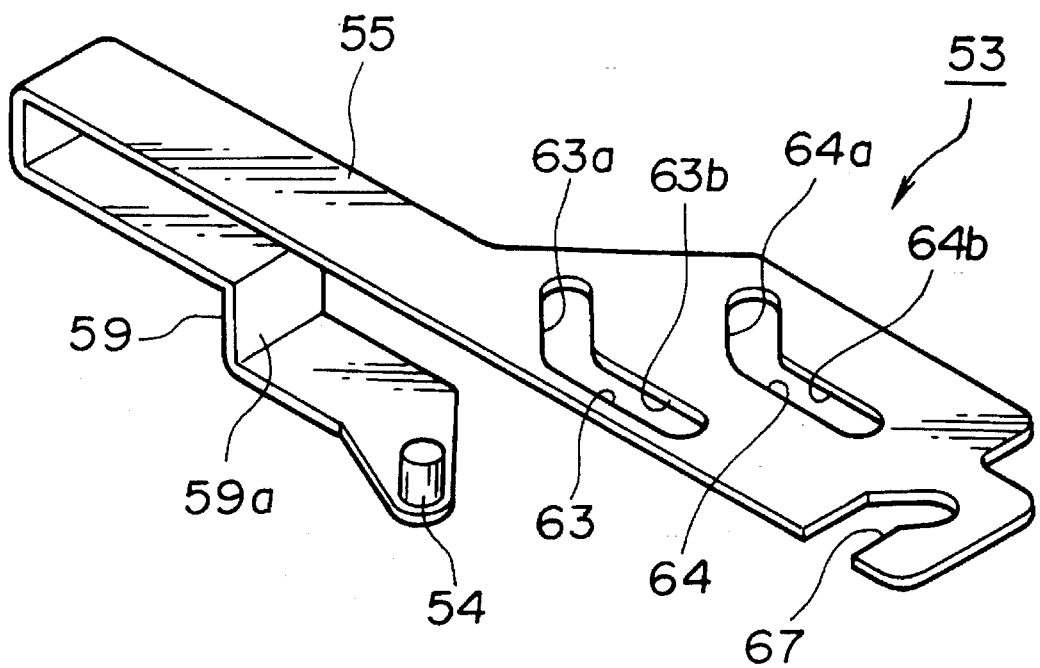
FIG. 30 shows a perspective view of an alternative embodiment of a cartridge capturing member.

For example, for providing a smooth sliding movement of the cartridge capturing member 55 by the rotational movement of the cartridge capturing operating lever 57, the engaging opening 67 engaged by the pin 69 provided on the cartridge capturing operating lever 57 may be bent at its distal end instead of being straight-shaped as shown in FIG. 30. In this manner, the rotational torque of the cartridge capturing operating lever 57 may be effectively used for producing the movement of the cartridge capturing member 55.

What is claimed is:

1. A disc cartridge loading apparatus, comprising:

a cartridge holder for holding a disc cartridge;

cartridge capturing means slidably mounted on the cartridge holder and including a cartridge capturing member having a capturing pin introduced into and engaged with a recess of the disc cartridge, said cartridge capturing member having at least one guide means formed therein causing said capturing pin to be introduced into and engaged in the recess of the disc cartridge, said capturing pin not being contacted with said cartridge holder until said guide means cause said capturing pin to engage said cartridge holder;

cartridge capturing operating means for sliding said cartridge capturing means in a disc cartridge insertion direction under the bias of biasing means to capture the disc cartridge into said cartridge holder; and said guide means comprises a first and a second guide grooves, said first guide groove and said second guide groove being continuously connected with a predetermined angle.

2. A disc cartridge loading apparatus, comprising:

a cartridge holder for holding a disc cartridge;

cartridge capturing means slidably mounted on the cartridge holder and including a cartridge capturing member having a capturing pin introduced into and engaged with a recess of the disc cartridge, said cartridge capturing member having at least one guide means formed therein causing said capturing pin to be introduced into and engaged in the recess of the disc cartridge, said capturing pin not being contacted with said cartridge holder until said guide means cause said capturing pin to engage said cartridge holder;.

cartridge capturing operating means for sliding said cartridge capturing means in a disc cartridge insertion direction under the bias of biasing means to capture the disc cartridge into said cartridge holder;

said cartridge holder further comprising guiding means which has a first guide portion and a second guide portion continuously formed to said first guide portion with a predetermined angle, and said apparatus further comprises a shutter opening member for opening a shutter member of the disc cartridge and slidably mounted on said cartridge holder, said shutter opening member being moved along said guiding means by the insertion of the disc cartridge into said cartridge holder; and said first guide portion of said guiding means is inclined to the disc cartridge insertion direction and said second guide portion of said guiding means is parallel to the disc cartridge insertion direction, wherein the angle of inclination of said first guide portion is equal to or greater than the angle of inclination of a mistaken insertion inhibiting portion of the disc cartridge.

* * * * *